(12) United States Patent
Loos

(10) Patent No.: US 9,145,538 B2
(45) Date of Patent: Sep. 29, 2015

(54) METHODS AND APPARATUS FOR CAP MANAGEMENT AND MITIGATION OF SELECTED UNDESIRABLE MATTER DURING FERMENTATION

(71) Applicant: Loos Family Winery, LLC, San Jose, CA (US)

(72) Inventor: Bradley Joseph Loos, San Jose, CA (US)

(73) Assignee: Loos Family Winery, LLC, San Jose, CA (US)

( * ) Notice: Subject to any disclaimer, the term of this patent is extended or adjusted under 35 U.S.C. 154(b) by 444 days.

(21) Appl. No.: 13/713,795

(22) Filed: Dec. 13, 2012

(65) Prior Publication Data

US 2014/0170263 A1 Jun. 19, 2014

(51) Int. Cl.
| | | |
|---|---|---|
| C12G 1/02 | (2006.01) | |
| C12G 1/032 | (2006.01) | |
| B01F 11/00 | (2006.01) | |
| B01F 13/00 | (2006.01) | |
| B01F 15/00 | (2006.01) | |

(52) U.S. Cl.
CPC .......... *C12G 1/0216* (2013.01); *B01F 11/0082* (2013.01); *B01F 13/002* (2013.01); *B01F 15/00506* (2013.01)

(58) Field of Classification Search
CPC .................................................... C12G 1/0216
USPC ............ 99/276, 348; 366/129, 256–260, 332, 366/333
See application file for complete search history.

(56) References Cited

U.S. PATENT DOCUMENTS

| | | | | |
|---|---|---|---|---|
| 80,616 | A | * | 8/1868 | Fiske .............................. 366/259 |
| 1,241,307 | A | * | 9/1917 | Tompkins ..................... 366/129 |
| 4,473,001 | A | | 9/1984 | Rieger |
| 4,474,890 | A | | 10/1984 | Rieger |
| 4,479,721 | A | | 10/1984 | Rieger |
| 4,745,068 | A | | 5/1988 | Godfrey et al. |
| 4,934,828 | A | | 6/1990 | Janssen |

(Continued)

FOREIGN PATENT DOCUMENTS

| | | |
|---|---|---|
| EP | 0089225 A2 | 9/1983 |
| EP | 0871699 B1 | 1/2003 |

(Continued)

OTHER PUBLICATIONS

Cocolin and Ercolini, (Eds.) *Molecular Techniques in the Microbial Ecology of Fermented Foods* (2008) Springer, Mills et al., "Wine Fermentation", Chapter 6, pp. 162-192.

(Continued)

*Primary Examiner* — David Sorkin
(74) *Attorney, Agent, or Firm* — Kilpatrick Townsend and Stockton LLP

(57) ABSTRACT

Methods and apparatus are disclosed for: 1) the gentle, controlled mixing of solid and liquid botanical components during fermentation; and 2) the regulation of parameters in cap material and juice during primary fermentation to optimize attributes such as expressive organoleptic characteristics including bouquet, texture and flavor, while simultaneously and selectively monitoring and mitigating the deleterious effects of reduced sulfur compounds, harmful bacteria, multicellular fungi, and/or biogenic amines during the artisan creation of ultra-premium fine wines and other alcoholic libations according to a customized schedule.

8 Claims, 17 Drawing Sheets

(56) References Cited

U.S. PATENT DOCUMENTS

| | | |
|---|---|---|
| 5,472,278 A | 12/1995 | Kawaoka et al. |
| 5,744,183 A | 4/1998 | Ellsworth et al. |
| 5,972,402 A | 10/1999 | Scholl et al. |
| 6,125,736 A | 10/2000 | Marin |
| 6,280,072 B1 * | 8/2001 | Poston ............... 366/1 |
| 6,703,055 B1 | 3/2004 | Klien et al. |
| 6,905,601 B2 | 6/2005 | De Baere et al. |
| 7,198,809 B2 | 4/2007 | Leonhardt et al. |
| 7,353,750 B2 | 4/2008 | Francia |
| 7,571,673 B2 | 8/2009 | Zanon et al. |
| 8,216,803 B2 | 7/2012 | Bisson et al. |
| 8,246,242 B2 * | 8/2012 | Sato et al. ............ 366/256 |
| 2005/0147776 A1 | 7/2005 | Cheng |
| 2006/0156929 A1 | 7/2006 | Nelson et al. |
| 2006/0240146 A1 | 10/2006 | Melandri et al. |
| 2008/0175951 A1 | 7/2008 | Rule |
| 2010/0143536 A1 | 6/2010 | Bisson et al. |
| 2011/0024418 A1 | 2/2011 | Batson |
| 2011/0305794 A1 | 12/2011 | Garcia Cordente et al. |
| 2012/0064610 A1 | 3/2012 | De Baere et al. |
| 2012/0190386 A1 | 7/2012 | Anderson |
| 2012/0269925 A1 | 10/2012 | Farotto |
| 2013/0199376 A1 | 8/2013 | Rule |

FOREIGN PATENT DOCUMENTS

| | | |
|---|---|---|
| EP | 1049764 B1 | 8/2005 |
| WO | WO 97/14781 A1 | 4/1997 |
| WO | WO 97/44437 A1 | 11/1997 |
| WO | WO 03/011440 A1 | 2/2003 |
| WO | WO 2006/079987 A2 | 8/2006 |
| WO | WO 2006/095367 A1 | 9/2006 |
| WO | WO 2007/053588 A2 | 5/2007 |

OTHER PUBLICATIONS

Held et al., "Histamine Analysis in Wine Samples Using the Microplate Format" *BioTek Instruments* (Aug. 29, 2006), http://www.biotek.com/resources/articles/histamine-microplate-format.html.

Kierans et al., "Silver tolerance and accumulation in yeasts" *Biology of Metals* (1991) 4:100-106.

Lee et al., "Eco-toxicity of commercial silver nanopowders to bacterial and yeast strains" *Biotechnology and Bioprocess Engineering* (2009) 14:490-495.

Lehtonen, "Determination of amines and amino acids in wine—a review" *Am. J. Enol. Vitic.* (1996) 47:127-133.

Marcobal et al., "Formulation of biogenic amines throughout the industrial manufacture of red wine" *J. Food Prot.* (2006) 69(2):397-404.

Slawson et al., "Germanium and silver resistance, accumulation, and toxicity in microorganisms" *Plasmid* (1992) 27:72-79.

Ichikawa et al., "Effect of cap management technique on the concentration of proanthocyanidins in Muscat Bailey A wine" *Food Sci. Technol. Res.* (2012) 18(2):201-207.

Sampaio et al., "Use of microscale fermentations in grape and wine research" *Am. J. Enol. Vitic.* (2007) 58(4):534-539.

* cited by examiner

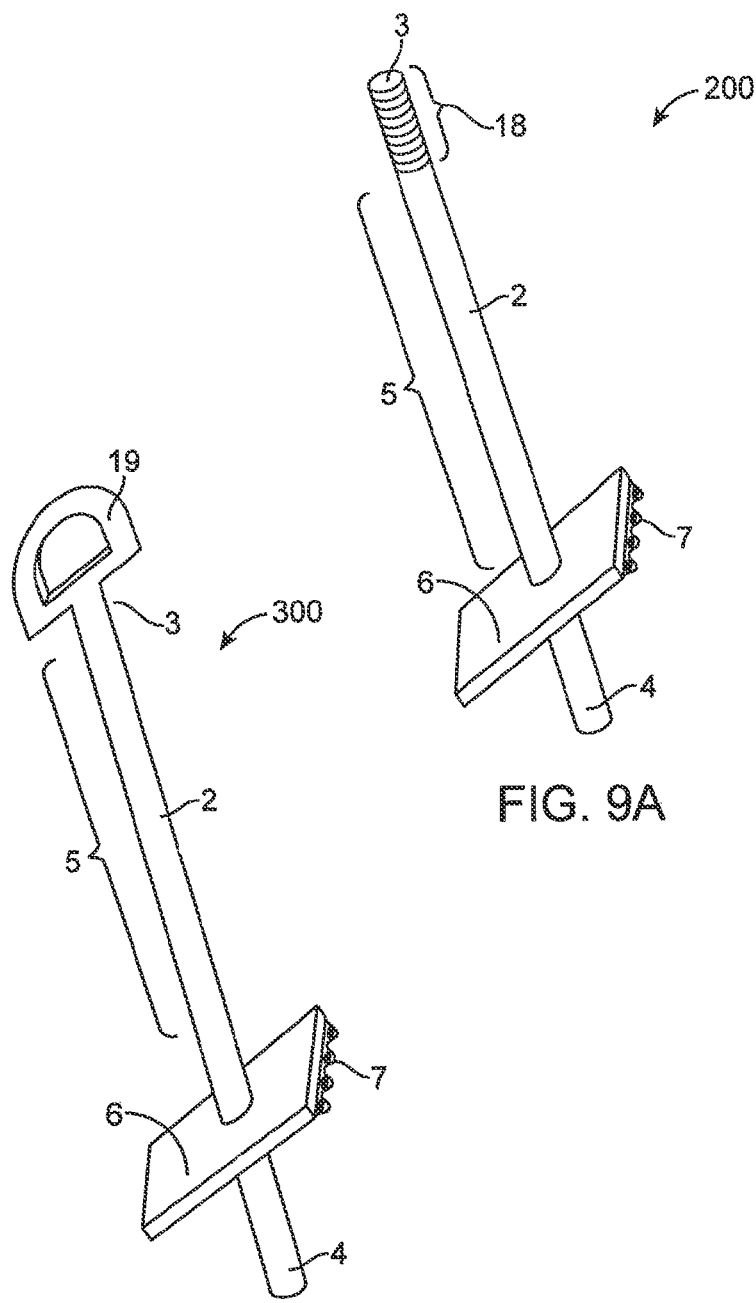
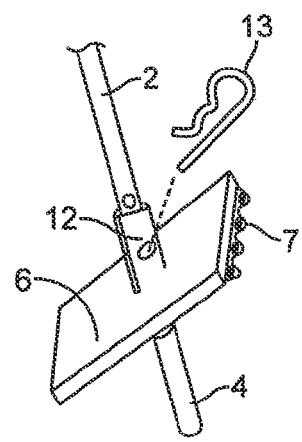
FIG. 9A
FIG. 9B
FIG. 10A

| VARIABLES | | | | |
|---|---|---|---|---|
| Plate Type | Fermentation Vessel Location | Number of Extensions & Retractions at Location | Duration (seconds) | Depth (relative) |
| Oxidative Metal | 29 | 3 | 4 | Medium |
| Oxidative Metal | 39 | 2 | 3 | Shallow |
| Oxidative Metal | 40 | 2 | 3 | Shallow |
| Oxidative Metal | 43 | 2 | 3 | Shallow |
| Oxidative Metal | 44 | 2 | 3 | Shallow |
| Oxidative Metal | 29 | 3 | 4 | Medium |

FIG. 16C

| VARIABLES | | | | |
|---|---|---|---|---|
| Plate Type | Fermentation Vessel Location | Number of Extensions & Retractions at Location | Duration (seconds) | Depth (relative) |
| Noble Metal | 25 | 3 | 5 | Deep |
| Oxidative Metal | 26 | 2 | 3 | Medium |
| Noble Metal | 27 | 3 | 5 | Deep |
| Oxidative Metal | 28 | 2 | 3 | Medium |
| Noble Metal | 29 | 4 | 5 | Deep |
| Oxidative Metal | 30 | 2 | 3 | Medium |
| Noble Metal | 31 | 3 | 5 | Deep |
| Oxidative Metal | 32 | 2 | 3 | Medium |
| Noble Metal | 33 | 3 | 5 | Deep |
| Noble Metal | 34 | 3 | 5 | Deep |
| Noble Metal | 37 | 3 | 5 | Deep |
| Noble Metal | 46 | 3 | 5 | Deep |
| Noble Metal | 49 | 3 | 5 | Deep |

FIG. 16E

METHODS AND APPARATUS FOR CAP MANAGEMENT AND MITIGATION OF SELECTED UNDESIRABLE MATTER DURING FERMENTATION

BACKGROUND OF THE INVENTION

For over seven millennia, fermented beverages have been a popular and common drink. Today, wine alone is estimated to contribute over a hundred billion dollars to the American economy. There are more than five thousand wineries in the United States including at least one winery in each state.

Many problems associated with the preparation of alcoholic beverages, including wine and beer, occur during primary fermentation when yeasts anaerobically convert sugar into carbon dioxide and ethyl alcohol by way of the following chemical reaction:

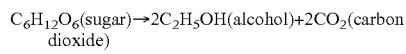

$$C_6H_{12}O_6(\text{sugar}) \rightarrow 2C_2H_5OH(\text{alcohol}) + 2CO_2(\text{carbon dioxide})$$

One of the most critical steps required to ensure a successful fermentation is the careful extraction of desirable components including phenols, for example. Phenolic compounds, both natural phenol and polyphenols, include a large group of several hundred chemical compounds that affect the taste, color and mouthfeel of wine. Natural phenols can be broadly separated into two categories: flavonoids and non-flavonoids. The flavonoids include anthocyanin and tannins which contribute to the color and mouthfeel of the wine or other fermented botanical components. The non-flavonoids include the stilbenoids such as resveratrol and phenolic acids such as benzoic, caffeic and cinnamic acids.

High quality (i.e. ultra-premium) wine grapes weigh a mere tenth of an ounce or about one-fifth the weight of common table grapes. The skin to pulp ratio for wine grapes determines the actual concentration of polyphenols. During fermentation, oxygen ($O_2$), hydrogen ($H_2$), and other molecules polymerize new molecular combinations, ultimately imparting an evocative array of complex organoleptic attributes to the finished wine.

The extraction of desirable components can be accomplished via good cap management. Nowhere is this more prophetic than during the production of fine red wine (from grapes) or fruit wine (from other fruit sources), although alcoholic fermentation using any botanical component(s) will undoubtedly benefit from diligent cap management.

Residual sugar (RS) caused by sluggish or stuck fermentations and volatile acidity caused by distillable acids like acetic, lactic, butyric, propionic, and formic acids, are common examples of erroneous ferments; however, the presence of undesirable matter, including chemical and bacterial contaminants, can also be problematic. Most fermentation troubles can be specifically attributed to poor cap management.

On average, about 75 percent of the fermentation activity will occur during primary fermentation. As fermentation proceeds, each yeast cell produces carbon dioxide ($CO_2$) beyond the capacity of the juice to keep it in solution Skins and seeds are less dense than the fermenting liquid and tend to form a solid cap of material which is usually about 33% by volume when fermenting grapes. Carbon dioxide gas bubbles rise and adhere to the solid material causing it to float upward, rise above the juice, and dry out to form a cap as the juice slowly drains away.

Cap Management

Cap management generally relates to the control of physical, chemical and biological interactions between solid cap material (or pomace) and juice (or must) during primary fermentation. The word "pomace" is considered a subset of solid cap material that specifically includes grape skins, grape seeds (i.e. pips) and/or grape stems. The word "marc" refers to only the grape skins and seeds. As used herewith, the word "juice" refers to any liquid component before or during fermentation and the word "must" refers specifically to grape juice before or during fermentation. The word "ferment" refers to any fermenting substance. The word "wine" is generally used to describe the liquid component post-fermentation using grapes. Primary fermentation is used synonymously with alcoholic fermentation and secondary fermentation is used synonymously with malolactic fermentation for purposes of this disclosure and general discussion. The following terms are used interchangeably throughout this document: aroma/bouquet/essence; mouthfeel/texture/smoothness; and taste/flavor/savor.

The formation of a cap (or chapeau) is a potentially dangerous situation. Left unchecked, the dry cap material, oxygen, and warmth provide an ideal environment for harmful strains of bacteria. If a cap isn't properly managed, several other deleterious events can occur: 1) the cap temperature overheats and kills the yeast before enough sugar is consumed; 2) acetic acid bacteria (e.g. *Acetobacter aceti, A. cerevisiae, A. liquefaciens* and others) proliferate and begin converting ethanol to acetic acid in the presence of oxygen which, in turn, forms acetaldehyde which ultimately spoils the wine; and 3) the fermentation can stratify and/or stick. A stratified fermentation includes the establishment of two or more distinct micro-environments. This is usually due to insufficient mixing. A stuck fermentation occurs when yeasts become dormant before the fermentation is complete. Poorly managed caps contribute to large quantities of ruined wine each year.

Therefore, it's prudent to manage a fermentation cap to accomplish at least these goals: 1) keep the cap moist enough for the yeast to remain active; 2) keep the cap cool enough for the yeast to remain active; 3) redistribute sugar and nutrients so that they remain accessible to the yeast; 4) keep cap solids in anaerobic conditions to prevent volatile acidity and other issues; and 5) extract desirable components, including phenols.

Historically, a number of enological techniques have been used to accomplish one or more of the above-identified goals. The main categories generally include: 1) pump over; 2) submerged cap; 3) rotary tank; 4) rack and return (i.e. délestage); 5) timed gas-pressure release; 6) pneumatage; and 7) punch down (i.e. pigeage).

Pump over systems remove a volume of juice from the bottom of the vessel and pump it back over the top of the floating cap to keep the cap moist. These systems are one of the more oxidative cap management techniques. Even though carbon dioxide ($CO_2$) quickly displaces almost all the oxygen ($O_2$) out of the headspace in the fermentation vessel, the physical motion of the juice falling through the headspace from the irrigator to the top of the cap will tend to cause excessive $O_2$ from the outside atmosphere to be brought into the headspace. Introduction of too much $O_2$ and aggressive mixing are major drawbacks of this approach.

Submerged cap systems use a grate or other partition in the fermentation vessel to keep the skins submerged throughout the fermentation. Unfortunately, this type of cap management system often causes stratification unless a pump over system is also employed.

Rotary tanks are rotated on their horizontal axis which leads to mixing the pomace (i.e. grape skins, seeds and stems) with the must (i.e. grape juice) during winemaking. This assures regular contact of the cap and ethanol produced by the yeasts and also creates a more uniform temperature during the fermentation. Stationary mixing tanks provide a vertical impeller for mixing. These types of systems allow for maximum extraction in a minimum amount of time. This is not necessarily an advantage because aggressive mixing often results in an imbalance of tannin and fruit and/or excessive oxygenation which can age wine prematurely. In fact, with the exception of Sherry, Port, Madeira and white wines from the Jura region of France, oxidation is considered a technical fault. Wines lacking the protective benefits of tannins are more susceptible to oxygen exposure during the winemaking process.

Rack and return (délestage) is a common cap management protocol used in winemaking that first removes of all the must from the fermentation vessel. The must is then poured back onto the cap to fully submerse the cap. When used with ripe fruit, this regime can lead to a wine with less structure. Therefore, this approach should be reserved for wines showing excessive tannins.

Timed gas-pressure and release systems, including those produced by Ganimede®, capture $CO_2$ as it is produced during fermentation. The gas displaces some of the must and lifts it upward in the fermentation vessel. A solenoid periodically releases the gas to allow the cap to fall back in the vessel. This action is designed to break up and irrigate the cap.

Pneumatage employs plates to trap gas bubbles until the resulting bubble is large enough to overcome the surface tension of the liquid at which point the growing bubble escapes from under the plate and ascends through the must. The movement of the bubble through the column of must breaks up the cap when it reaches the surface. Pneumatage, as well as the previously described gas-pressure and release systems, are not economical methods for small (i.e. boutique) wineries and it's sometimes difficult to control the mixing as the bubbles randomly ascend.

The term "punch down" (i.e. pigeage) describes the process of breaking up the cap by randomly pushing it back down into the juice. While pigeage doesn't require any pumping, it aggressively mixes the cap by disintegrating the cap material to disassociate the pulverized cap material into the juice. Pigeage is also somewhat limited by the size of the fermentation vessel. Fermenters larger than five tons tend to generate caps that are too thick for manual pigeage and thus benefit from a semi-automatic system. Fully-automated industrial pigeage systems can get as large as 35 to 50 tons in capacity.

Regardless of the mixing technique or fermentation vessel chosen, the duration of time the solid components are in contact with the juice is the controlling factor for extraction of phenolic compounds. Excessive extraction and the accompanying bitterness and astringency that follow can cause yet another set of problems. Red wines are typically aged longer than white wines so excessive extraction may be tempered by extended aging of red wines, in particular. However, additional aging may not be an option due to controlling economic factors or limited long term storage capacity, for example.

Extraction can be difficult to control. Microwave irradiation and thermovinification are two extraction techniques that have been used. Thermovinification heats up the entire cap material. This method favors extractions but can reduce the desirable characteristics and compromises color stabilization to ultimately lower the quality of the finished wine. Irradiation can be expensive to implement and may destroy a large amount of important phytochemicals and nutrients.

Traditional pigeage tools, such as the example shown in FIG. 1, can cause seeds to be inadvertently crushed between the disk and the bottom of the vessel which exacerbates the release of harsh tannins into the wine. This is a particular concern when using shallow open top fermentation vessels. Conventional tools are also difficult to push downward and lift upward due to the lack of hydrodynamic design and the strong resistance created by the disk as it is moved through viscous juice. The solid components also adhere to the top of the disk making it difficult to lift the tool out of the vessel and move it to other locations around the fermentation vessel when mixing the components. Solid components are sometimes dislodged from the disk by banging the tool on the edge of the vessel. This can be messy and unsanitary as must and/or pomace randomly splatter.

Manual cap punch down requires significant strength and can cause back pain and physical injury, particularly if the worker is standing alongside the fermentation vessel and must lean over the vessel to punch down the cap. Alternatively, punching down a cap may require balancing on the edge of a fermentation vessel or catwalk to position the worker directly above the vessel. In these days of health and safety awareness it is somewhat surprising that this operation is still permitted, as a number of people have fallen into vessels of fermenting wine while punching down the cap, several with fatal results.

Automated punch down units have eliminated the physical strength required during pigeage and are routinely used in industrial bulk wine production; however, the expense and maintenance of specialized machinery eliminates automation as a viable option for boutique commercial wineries and hobbyists. Furthermore, automation of traditional mixing techniques does not solve other cap management issues such as mitigating reduced sulfur compounds, harmful bacteria, multicellular fungi and/or biogenic amines. Nevertheless, some embodiments of the invention are suitable for automated punch down units, commercial wineries, or wherever cap management can be improved.

Reduced Sulfur Compounds

Sulfur (S) is difficult to avoid during fermentation because relatively small amounts are naturally present on many fruits. Larger amounts of sulfur may arrive on harvested grapes sprayed in the vineyard to protect the crop from disease. The chemically related sulfites are reported by some consumers to be a significant cause of headaches and perhaps other maladies. Small amounts (about 10 parts per million) of hydrogen sulfide ($H_2S$) and other reduced sulfur compounds are formed when yeasts convert sulfur to $H_2S$ during fermentation in an oxidation-reduction reaction as shown below with net electron transfer indicated:

$$S^0(\text{sulfur}) + H_2^0(\text{hydrogen}) \rightarrow S^{2-}H_2^+(\text{hydrogen sulfide})$$

Hydrogen sulfide formation is a chronic problem in the wine industry worldwide. Under normal conditions, some $H_2S$ is volatilized from the wine or other ferment along with $CO_2$; however, the residual $H_2S$ may pose a serious problem due to its low sensory threshold and its potential reactivity. Hydrogen sulfide smells of rotten eggs and is generally considered to be a fatal flaw in finished wine. Amounts of $H_2S$ over 1.0 parts per billion (ppb) are readily detectable by human olfaction. Even amounts below this threshold can react with ethanol or acetaldehyde to form mono- and di-mercaptans, which radiate strong garlic and petroleum aromas, respectively, both before and/or after bottling as generally depicted below:

$$H_2S(\text{volatile}) \rightarrow \text{mono-mercaptans(becoming bound)} \rightarrow \text{poly-mercaptans(bound)}$$

Removal of $H_2S$, particularly bound mercaptans produced near the end of fermentation, can be extremely difficult if not technically challenging. This process is not discrete. While $H_2S$ is present, it is likely that mono-mercaptans are forming; and poly-mercaptans may be forming before the $H_2S$ in its volatile form disappears. Research shows that mercaptan formation occurs within a few days after the beginning of fermentation and is at its peak at about two months after which the poly-mercaptans become dominant.

One traditional "solution" used to eliminate $H_2S$ has included aeration; however, mono- and di-mercaptans are formed by aggressive aeration. Therefore, aeration may actually compound the problem or at least require subsequent protocols to remove the mercaptans. Even gently splashing wine to eliminate sulfide aromas can encourage the formation of disulfides which can serve as a reservoir from which sulfides can be re-formed under reductive conditions such as after bottling.

In more severe or advanced cases, solutions of, or filters impregnated with, copper sulfate ($CuSO_4$), have been used to remove $H_2S$ and mono-mercaptans. However, copper sulfate is poisonous and, therefore, requires further steps of fining with bentonite (or another absorbent aluminum phyllosilicate) or Sparkolloid® in order to remove it from the ferment. The fining agent must then be removed by filtering which, unfortunately, also removes many of the desirable components of the wine. Other methods use radiation to remove harmful gasses from wine but this approach prematurely ages the wine and is expensive to employ in small scale winemaking operations.

Another way to manage cap micro-environments and prevent reduced sulfur compounds includes using yeasts that are genetically modified not to catalyze the conversion of sulfite to sulfide. However, the use of altered organisms remains controversial and this approach does nothing to address control of reduced sulfur compounds in non-inoculated fermentations (e.g. using only wild or natural yeasts), for example.

Harmful Bacteria

Harmful bacteria are another potential inhabitant of the cap and surrounding material. Although some forms of lactic acid bacteria (principally *Oenococcus oeni*) play a positive role during malolactic fermentation (MLF), bacteria can prove detrimental during primary fermentation, particularly if the pH rises above about 3-4 as this range encourages bacterial proliferation. Most recalcitrant bacteria belong to the genera: *Leuconostoc* (rancid butter flavor); *Pediococcus* (bitter flavor); and *Lactobacillus* (sauerkraut aroma). These organisms are gram positive and can grow well throughout various depths in the ferment because they are microerophilic (i.e. they do not require much oxygen). Both lactic acid bacteria (LAB) and acetic acid bacteria (AAB) routinely exist on the surface of grapes prior to crushing. The subsequent crushing process increases the propagation and colonization potentials of these microbes. In addition, harmful bacteria can also contaminate the grape juice via winemaking equipment and spoilage biofilms formed inside hoses and pipes. Some species or strains of lactic acid bacteria acidify wine and give it an undesirable bitter palate and/or musty odor. Harmful lactic acid bacteria can also form biogenic amines in the wine. Acetic acid bacteria can spoil wine by literally turning it into vinegar.

If harmful bacterial cells are identified early, their numbers may be kept to a safe level. Attempts to control harmful bacteria have included, for example, treatment with sulfur dioxide ($SO_2$) gas, potassium metabisulphite ($K_2S_2O_5$) and/or filtration. As previously discussed, adding forms of sulfur and/or filtering have their own unique drawbacks. Potassium metabisulphite is also an allergen for some individuals.

Multicellular Fungi

Multicellular fungi may also find a suitable home in cap material, especially when spores are inadvertently transferred into the winery from the vineyard during harvest. Mold and mildew are two common examples of fungi that can spoil wine or other liquids during primary fermentation. Spores of mold and mildew, like bacteria and yeasts, naturally exist on most surfaces. Too much head space in a covered fermentation vessel or tank or unsanitary equipment contribute to their growth and potential ecological succession. A musty odor, wet wood odor, or an oily/rainbow appearance on the surface of the liquid are usually initial indications of a fungus problem.

A common "solution" in wine tainted by mold and/or mildew is to rack the wine into a sanitized container. This step is followed by the addition of campden tablets to remove the additional oxygen introduced by racking Campden tablets are a sulfur-based product, usually in the form of sodium metabisulfite, that suffer from the same limitations as previously described.

Biogenic Amines

Biogenic amines can be formed by a wide range of yeasts and some (mostly malolactic) bacteria. Most important among the amines found in wine are histamine and tyramine. The presence of histamine, like sulfites, has been implicated as a potential cause of headaches that some people experience after imbibing alcoholic beverages. Biogenic amines may cause allergic reactions and changes in blood pressure as well. Other biogenic amines such as cadaverine and putrescine, as their names suggest, have extremely foul odors which mask fruit flavors (and turn stomachs). Preventive techniques include cold soaking combined with flash pasteurization. Curative reduction of biogenic amines by bentonite absorption and yeast cell hull preparations have been attempted albeit with mixed results. Separation columns or filters have been used but these methods fail to adequately select only the undesirable matter and, therefore, inevitably also remove attributes which make a positive contribution to the quality of the wine.

Information related to attempts to address these problems can be found in U.S. Pat. Nos. 4,473,001; 4,479,721; 4,745,068; 4,474,890; 4,934,828; 5,472,278; 5,744,183; 5,972,402; 6,125,736; 6,703,055 B1; 6,905,601 B2; 7,198,809 B2; 7,353,750 B2; 7,571,673 B2; 8,216,803 B2; and United States Patent Application Publication Numbers: 2005/0147776 A1; 2006/0156929 A1; 2006/0240146 A1; 2008/0175951 A1; 2010/0143536 A1; 2011/0024418 A1; 2011/0305794 A1; 2012/0064610 A1; 2012/0190386 A1; and 2012/0269925 A1 as well as European Patent Numbers: EP 0089225 A2; EP 0871699 B1; EP 1049764 B1 and International Patent Publication Numbers: PCT/WO 97/14781 A1; and PCT/WO 03/011440 A1, for example. Various types of cap management equipment and technologies, including some embodiments of the invention, can mitigate or reduce the effect of, or even take advantage of, some or all of these potential problems.

For the foregoing reasons, there's a legitimate need for effective and efficient ways to facilitate cap management including selectively mitigating undesirable matter during fermentation. It would be particularly beneficial and desirable to provide methods and apparatus for cap management to facilitate some or all of the following: regulate fermentation parameters; optimize organoleptic attributes; and/or selectively and simultaneously mitigate (or eliminate) undesirable matter including reduced sulfur compounds, harmful bacteria, multicellular fungi and/or biogenic amines.

BRIEF SUMMARY OF THE INVENTION

Certain embodiments of the invention relate generally to managing fermentation parameters required to produce alcoholic beverages. More specifically, some embodiments of the present invention satisfy the need of providing methods and apparatus for cap management, including the selective mitigation (or elimination) of undesirable matter such as reduced sulfur compounds, harmful bacteria, multicellular fungi and/or biogenic amines, during the production of ultra-premium fine wines.

In accord with a first embodiment, an apparatus is provided for mixing a solid botanical component with a liquid botanical component with the solid component rising above the liquid component during fermentation. The apparatus comprises a rigid shaft having a first end, a second end, and a middle section located between them. The shaft is positioned above the solid component in a substantially vertical orientation relative to the solid component. The shaft is operational in a first downward motion followed by an (essentially reciprocating) upward motion. A first agitation blade is attached to the shaft at a first location between the first and second ends of the shaft. The first blade is disposed at a first oblique angle to the shaft. The first blade can be circular, oval, square, rectangular, triangular, or any other desired shape. Preferably, the blade is rectangular. It may include one or more holes. A first plate is releasably attached to the first blade so that, in use, the plate initially contacts the solid component to at least partially submerge and horizontally relocate portions of the solid component under the liquid component during the downward motion to mix the botanical components together. The shaft and blade can be comprised of an inert material and the plate can be comprised of either a noble metal or an oxidative metal. The oxidative metal is preferably copper, brass or bronze and the noble metal is preferably silver. The blade can be adjustably or removably attached to the shaft. The blade can be disposed at a first oblique angle to the shaft, preferably at an angle of between about 25 degrees and about 85 degrees, more preferably at an angle to the shaft of about 45 degrees. A second agitation blade can be attached to the shaft at a second location. The second blade is preferably disposed at a second oblique angle to the shaft and a second plate can be releasably attached to the second blade. Alternatively, the second blade can be aligned relative to the shaft at the same angle as the first blade. The second agitation blade can be circumferentially offset from or circumferentially aligned with the first agitation blade. The apparatus may have a plurality of agitation blades axially offset on the shaft from the first agitation blade. An attachment mechanism can be disposed on the first end of the shaft and is preferably circumferentially aligned with the first agitation blade. The attachment mechanism can be a handle to assist with manual manipulation of the apparatus.

A second embodiment provides an apparatus for use by a winemaker to manage the primary fermentation to create wine. The fermentation includes a pomace floating above a must. The apparatus can be structured as in the first embodiment, including that it can comprise a rigid shaft having a first end and a second end. A blade is affixed between the first end and the second end of the shaft and the blade is disposed at an oblique angle to the shaft. The shaft, when positioned in a substantially vertical orientation over a vessel containing the pomace and the must, is operational in a first downward direction and a reciprocal upward direction. The blade contacts the pomace and at least partially submerges and horizontally relocates a portion of the pomace during the downward direction to gently mix the pomace with the must. At least one plate can be, but need not be, releasably attached to the blades. The plate(s), which can be coated with an oxidative metal or a noble metal, first contacts the pomace during mixing with the blade.

A third embodiment provides a method of regulating parameters in a cap material and a juice during a primary fermentation of an alcoholic beverage to optimize attributes and mitigate undesirable matter. The method comprises the steps of providing a mixing apparatus for use during the fermentation. The apparatus can be structured as in the first embodiment including that it can comprise: a) a rigid shaft having a first end and a second end; b) an agitation blade can be affixed to the shaft, preferably at a location between the first end the second end with the agitation blade disposed at an oblique angle relative to the shaft; and c) a plate releasably attached to the blade. The plate has an optimized surface area that includes a metal. The shaft of the apparatus can be positioned in a substantially vertical orientation above a vessel containing the cap material and the juice. The apparatus is extended downward to a predetermined depth in the vessel. The blade and plate contact a portion of the cap material for a predetermined duration of time to at least partially submerge and horizontally relocate a portion of the cap material under the juice. The apparatus is retracted upward to cause the blade to rise at least partially above the cap material. A number of the extending and retracting steps are repeated and the apparatus produces a reciprocal motion to repeatedly mix the cap material with the juice. The shaft of the apparatus is repositioned to another location over the vessel and the positioning, extending, retracting and repositioning steps are repeated according to a predetermined schedule to regulate parameters during the primary fermentation of the beverage and thereby optimize the attributes and mitigate the undesirable matter. The apparatus can comprise a plurality of blades and the shape of each blade can be the same shape or a different shape from another blade. The oblique angle of each blade can be individually adjustable relative to the shaft. Furthermore, the location of each blade can be individually adjustable along the shaft between the first end and the second end of the shaft. The preferable attributes can include some or all of the organoleptic characteristics selected from the group consisting of aroma (i.e. bouquet or essence), mouthfeel (i.e. texture or smoothness) and taste (i.e. flavor or savor). When the shaft of the apparatus is repositioned to another location over the vessel, the holding, extending, retracting and repositioning steps can be repeated according to a schedule and the schedule can include at least one variable selected from the group consisting of: a) the horizontal location of the shaft of the apparatus above the vessel relative to the cap; b) the vertical height of the plate above the cap; c) the depth the apparatus is extended downward into the vessel; d) the duration of time the blade and plate contact the cap material; e) the number the extending and retracting steps are repeated; and f) the horizontal location the shaft of the apparatus is repositioned over the vessel after step e) is conducted. The primary fermentation can be monitored to determine the presence of undesirable matter. The predetermined schedule can be modified if the presence of undesirable matter is detected during the monitoring step. A copper plate may be selected when the monitoring step confirms the presence of a reduced sulfur compound. The level of copper in the juice can be tested during fermentation and after the fermentation.

The undesirable matter includes volatile substances selected from the group consisting of reduced sulfur compounds, bacteria, multicellular fungi and biogenic amines. The reduced sulfur compounds include any one or more of hydrogen sulfide, methanethiol, ethanethiol, 2-mercaptoethanol, dimethyl sulfide, dimethyl disulfide, diethyl sulfide, diethyl disulfide, carbon sulfide, and/or carbon disulfide, for example. Biogenic amines can include any one or more of histamine, tyramine, tryptamine, phenethylamine, cadaverine, putrescine, and/or isoamylamine and the aforementioned parameters include temperature, carbon dioxide, water, oxygen, pH, titratable acidity (TA), brix (i.e. sugar content), yeast, nutrients, and/or alcohol.

A fourth embodiment provides a method of regulating parameters in a cap material and a juice during a primary fermentation of an alcoholic beverage to optimize attributes and mitigate undesirable matter. The method provides an apparatus for use during a fermentation. The apparatus can be structured as in the first embodiment including that it can comprise: a) a rigid shaft having a first end and a second end; b) an agitation blade affixed to the shaft at a location between the first end and the second end; and c) a plate releasably attached to the blade. The agitation blade can be disposed at an oblique angle relative to the shaft. The plate has an optimized surface area that includes a metal. The method further provides selection of a varietal (or combination of varietals) and identification of a vintage (or vintages). One or more parameters are measured and a desired wine style is chosen. Next, a predetermined schedule is generated according to (i.e. based on) the varietal(s), vintages(s), parameter(s) and wine style. The schedule is implemented near a beginning of the fermentation by using the mixing apparatus according to the schedule. The fermentation is monitored to determine the presence of undesirable matter. Monitoring can include qualitative or quantitative monitoring using chemical, biologic, sensory, electronic or other methods to determine the presence of undesirable matter. The schedule can be modified if the presence of undesirable matter is detected during the monitoring step to regulate the parameters during the fermentation of the beverage and thereby optimize the attributes and mitigate the undesirable matter.

A fifth embodiment provides a method of managing a primary fermentation to create a wine while mitigating the deleterious effects of undesirable matter. The fermentation includes a cap material floating above a juice. The method provides an apparatus for use during a fermentation. The apparatus can be structured as in any of the previous embodiments including that it can comprise a rigid shaft having a first end and a second end. An attachment mechanism can be attached at the first end. A blade can be adjustably affixed to the rigid shaft at a location between the first end and the second end and the blade can be adjustably disposed at an angle of between about 25 and 85 degrees, preferably 45 degrees, relative to the shaft. The shape of the blade is a regular polygon (i.e. a plane shape having straight sides with all sides and all angles equal). The apparatus also comprises a plate releasably attached to the blade. The plate has an optimized surface area that includes an oxidative metal, a noble metal or even a combination of these metals. In use, the plate first contacts the cap material. The method further includes positioning the shaft of the apparatus in an substantially vertical orientation above an open-top fermentation vessel. The vessel contains the cap material and the juice. The apparatus is extended downward to a predetermined depth in the vessel and the blade and plate contact the cap material for a predetermined duration of time to at least partially submerge and horizontally relocate a portion of the cap material under the juice. The apparatus is retracted upward in a reciprocating motion to cause the blade to rise at least partially above the cap material. The extending and retracting steps are repeated which causes the apparatus to repeatedly submerge and horizontally relocate portions of the cap material under the juice. The shaft of the apparatus can be repositioned to another location above the fermentation vessel. The positioning, extending, retracting and repositioning steps are repeated according to a predetermined schedule. The predetermined schedule can include at least one variable selected from the group consisting of: a) the horizontal location of the shaft of the apparatus above the vessel relative to the cap; b) the vertical height of the plate above the cap; c) the depth the apparatus is extended downward into the vessel; d) the duration of time the blade and plate contact the cap material; e) the number the extending and retracting steps are repeated; and f) the horizontal location the shaft of the apparatus is repositioned over the vessel after step e) is conducted. The primary fermentation can be monitored for the presence of undesirable matter. The predetermined schedule can be modified and the apparatus can be used accordingly in the event undesirable matter presents during the monitoring step to mitigate the deleterious effects of undesirable matter during wine creation.

These and other features, aspects, and advantages of various embodiments of the invention will become better understood with regard to the following description, appended claims, accompanying drawings and abstract.

BRIEF DESCRIPTION OF THE DRAWINGS

FIGS. 9A and 9B are perspective views showing structures on the end of the shaft in accordance with certain embodiments of the invention.

FIG. 10A is a perspective view showing a mechanism for attaching a blade and shaft and adjusting the location of the blade along the shaft in accordance with one embodiment of the invention.

FIG. 16C is a table listing an example of a schedule for regulating parameters in cap material and juice during primary fermentation according to certain embodiments of the invention.

FIG. 16E is a table listing another example of a schedule of regulating parameters in cap material and juice during primary fermentation according to certain embodiments of the invention.

Other features of the present embodiments will be apparent from the accompanying drawings and from the detailed description that follows.

DETAILED DESCRIPTION OF THE INVENTION

Certain embodiments of the invention effectively and efficiently manage cap material while mitigating undesirable matter during fermentation, and they are particularly useful during primary fermentation. Certain embodiments also regulate fermentation parameters and optimize organoleptic attributes while selectively mitigating (or eliminating) undesirable matter including reduced sulfur compounds, harmful bacteria, multicellular fungi and/or biogenic amines.

Figure 1:
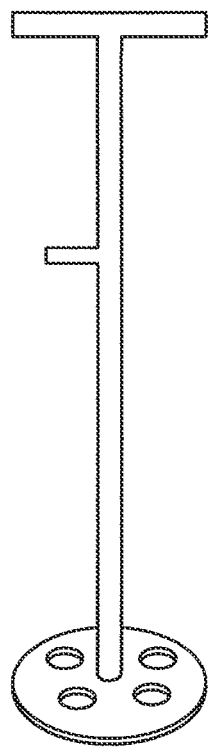
FIG. 1 schematically shows a conventional pigeage tool.
Figure 2:
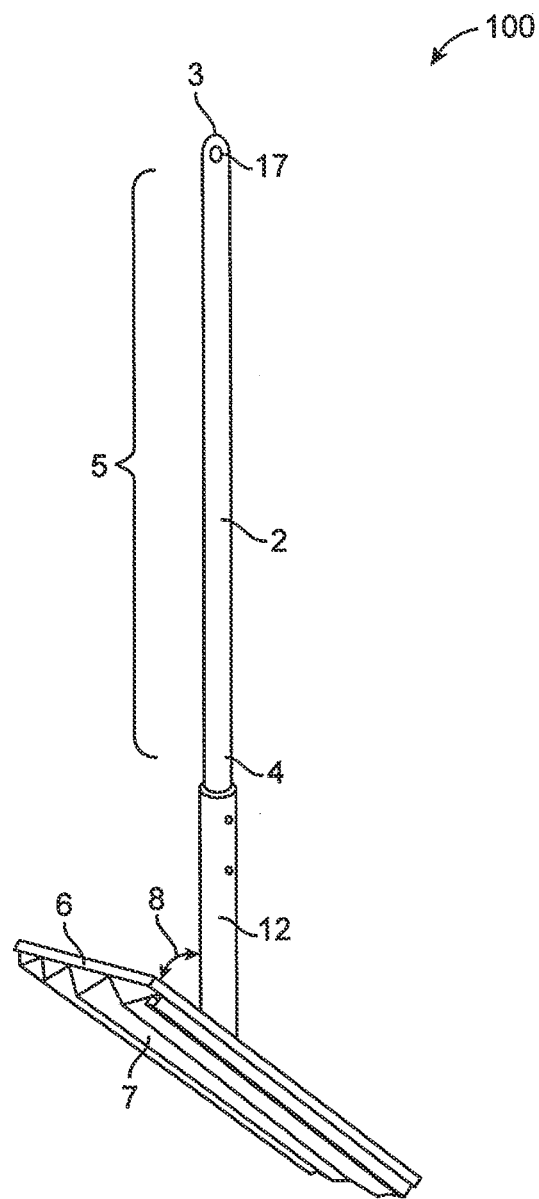
FIG. 2 is a perspective view of an apparatus according to one embodiment of the invention.
Figure 4A:
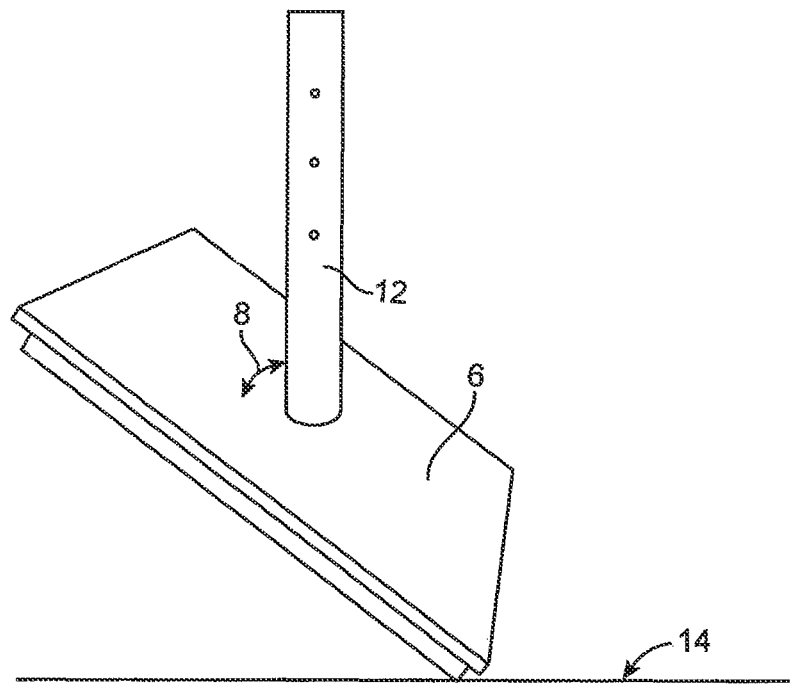
FIG. 4A is a side view of the apparatus of FIG. 2.
Figure 4B:
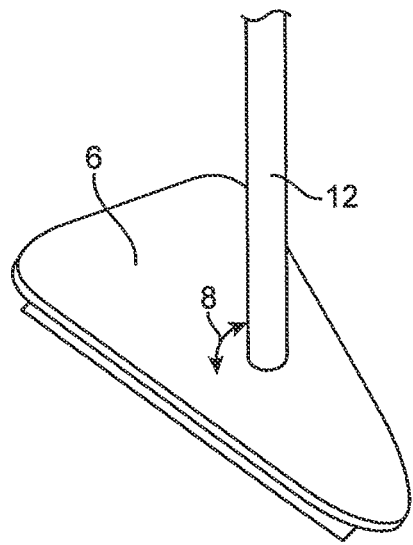
FIGS. 4B and 4C are side views of the apparatus showing examples of blade shapes in accord with certain embodiments of the invention.
Figure 4C:
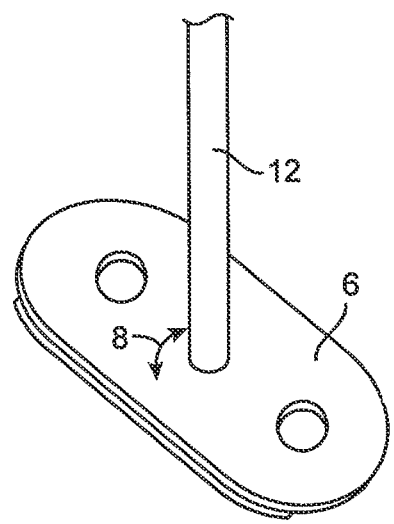

FIG. 2 is a perspective view of the apparatus 100 according to one embodiment of the invention. Non-limiting, exemplary apparatus and method claims are described further below. The particular mixing apparatus 100 of FIG. 2 includes a rigid elongate shaft 2 that includes a first end 3, a second end 4, and a middle section 5 located between the first and second ends. An agitation blade 6 is attached to the shaft 2 and a location between the middle section 5 and the second end 4 in this example. The blade 6 can be positioned at a location between the first end 3 and the second end 4 of the shaft 2. The blade 6 may also be circular, oval, square, triangular or any other desired shape, some examples of which are shown in FIGS. 4A through 4C. It can also include one or more holes as desired, as shown in FIG. 4C, for example. The shaft may be approximately 6 feet long and the blade may be a rectangular shape with approximate dimensions of about 11×15 inches although alternative sizes may be contemplated. These specific sizes are suggested as general examples only. The size of the apparatus can be scaled according to workload requirements and fermentation vessel (i.e. bin) dimensions, for example.

The blade 6 is attached to the shaft 2 at an oblique angle 8. The attachment may be in the form of a sleeve 12 fitted with a diameter to securely accept the shaft 2. FIG. 2 also shows a plate 7 located under the blade 6. A plate 7 need not be used. The blade 6 and/or plate 7 may be alternatively attached to the shaft 2 in any number of ways commonly known in the art. The blade 6 and plate 7 may be permanently attached at a fixed location to the shaft 2 or the blade and plate may be adjustable as further described below.

The apparatus 100, excluding the plate 7, may be made of any material, preferably an inert (i.e. non-reactive) material. Preferably, the inert material is industrial grade stainless steel including T-430, T-304, or T-316, for example. This prevents the blade and shaft components from chemically interacting with the fermentation but allows them to be easily cleaned while providing the mechanical strength and durability required for mixing.

Figure 3:
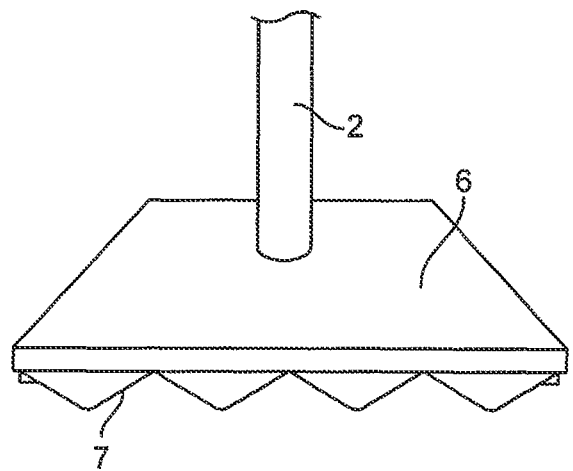
FIG. 3 is a front view of the apparatus of FIG. 2.

FIG. 3 is a front view of the blade 6 and shaft 2 showing the plate 7 positioned under the blade 6. The plate 7 may be permanently attached to the blade. Alternatively, the plate 7 may be releasably attached to the blade 6 for easy cleaning, recharging or replacement. The location of the plate 7 preferably ensures it is the first and last area of the apparatus to contact the pomace and must (FIGS. 15A-15D and 17A-17C). While the blade 6 and plate 7 provide mechanical mixing of the solid and liquid botanical components, plate 7 also preferably chemically and/or biologically influences the fermentation by mitigating undesirable matter.

The interaction of the plate 7 depends, in part, on the plate material and the type of chemical and/or biological intervention that is desired. For example, if the goal is to mitigate or eliminate harmful bacterial, multicellular fungi and/or biogenic amines, plate 7 may be made of a noble metal, preferably sterling silver, silver plating, or even silver-based nanoparticles or nanocrystals including Silcryst® (Nucryst Pharmaceutical Corporation), for example.

The noble metals are a class of metals that are resistant to corrosion and oxidation in moist air, unlike most base metals. The noble metals are considered to be (in order of increasing atomic number) ruthenium, rhodium, palladium, silver, osmium, iridium, platinum and gold as per the Periodic Table of Elements.

Silver is stable in pure air and water but tarnishes when it is exposed to air or water containing hydrogen sulfide, for example. As shown in the chemical reaction below, the tarnish appears as a black layer of silver sulfide ($Ag_2S$), which can be removed by wiping the plate with dilute hydrochloric acid.

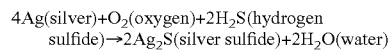
$4Ag(silver) + O_2(oxygen) + 2H_2S(hydrogen\ sulfide) \rightarrow 2Ag_2S(silver\ sulfide) + 2H_2O(water)$ The catalytic properties of silver make it ideal for use as a catalyst in oxidation reactions. Silver compounds and ions also exhibit a toxic effect on some bacteria, viruses, algae and fungi without the high toxicity to humans normally associated with other metals with antimicrobial properties such as lead and mercury, for example. Specifically, silver damages and inactivates the proteins in bacteria. Observations suggest that many of the bacteria most likely to be incapacitated or killed by silver are also the same bacteria that harm the fermentation process.

Silver disables the metabolic processes that viruses and multicellular fungi need to grow and reproduce; accordingly, it can affect the fermentation process. *Saccharomyces cerevisiae* and *Saccharomyces bayanus*, the yeasts most commonly used in winemaking, appear to be significantly less susceptible to the toxic effects of silver nanopowder and silver ions than bacteria. In 2003, the United States Food and Drug Administration (FDA) approved the use of silver in the food industry. Accordingly, in some embodiments, it is desirable to conduct monitoring, including but not limited to bacteriological and/or fungal monitoring, in combination with the apparatus of the invention.

Alternatively or additionally, if the goal is to chemically intervene to mitigate or eliminate reduced sulfur compounds, plate 7 may be made of an oxidative metal rather than a noble metal. Examples of oxidative metals include brass, bronze or copper. Chemists and metallurgists do not consider copper (and bismuth) to be noble metals because they easily oxidize, particularly in moist air, as depicted in the reaction below:

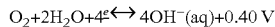

$$O_2 + 2H_2O + 4e^- \leftrightarrow 4OH^-(aq) + 0.40\,V$$

Like silver, copper or copper alloy touch surfaces possess intrinsic properties that destroy a wide range of microorganisms as confirmed by tests measuring bacteria after inoculating an alloy surface eight times in a 24-hour period without intermediate cleaning or wiping. The United States Environmental Protection Agency (EPA) has approved the registrations of these copper alloys as antimicrobial materials with health benefits which allows manufacturers to legally make claims as to the positive public health benefits of products made with registered antimicrobial copper alloys.

Additionally, hydrogen sulfide reacts with copper to form various copper sulfides on the surface of the metal to cause corrosion. Preferably, plate 7 is made of copper, copper plating, copper alloys or copper nanoparticles. Direct contact with copper changes the chemical composition of the stinky sulfur-containing compounds to eliminate them or at least render them less offensive. Pourbaix diagrams for copper in a sulfide containing aqueous medium can be complex due to the existence of many different sulfides. Observations indicate that the kinetics of desulfurization of hydrogen sulfide, using metallic copper as the desulfurizer, is initially controlled by interface reaction.

Depending on the volume, pH and other parameters of the fermenting material, the area of the plate 7 that is copper, and the time the plate 7 is in contact with the pomace and must, small amounts of copper ions are released into the ferment. In the United States, copper content in musts and wine normally range from less than 0.1 mg/L to 0.30 mg/L. Testing the level of copper in musts using a photometer both during and after fermentation using the apparatus with the copper plate attached, as described herewith, is encouraged because concentrations of copper between 1 mg/L and 9 mg/L may slow or delay alcoholic fermentation. Some government agencies limit the amount of copper found in commercial wines to less than 0.5 mg/L to avoid potentially unstable bottled wine, for example. When copper exceeds 2 mg/L in a finished wine, a metallic aftertaste may be perceived by some people. If necessary, excess copper can be easily removed by methods commonly known by those of ordinary skill in the art.

Copper metal can be encouraged to react in the presence of oxygen or certain oxidizing acids to release electrons from the metal. Micro-oxygenation can occur across the plate surface as the blade is extended and retracted in the cap material and juice. The apparatus, according to certain embodiments including but not limited to an angled blade, can strike an appropriate balance between too much oxygen and too little oxygen which can lead to oxidation and reduction, respectively. During fermentation, the added oxygen helps maintain the viability of the yeast to minimize the risk of stuck fermentation and the production of volatile substances like sulfides. The corrosion of copper first includes oxygen and water reacting with a fresh copper surface forming a sequential structure consisting of $Cu_2O/CuO/[Cu(OH)_2$ or $CuO \times H_2O]$, the main component being $Cu_2O$. This is later followed by reaction gases, including $H_2S$, as ionic constituents of aerosol particles or as ions in precipitation. Since the corrosion rate of the copper plate depends, in part, on the relationship between oxygen and temperature, it may be expedient to mitigate reduced sulfur compounds early in the fermentation cycle while the oxygen concentration in the must is relatively high and the temperature is relatively low. Observational analysis suggests that fermentation temperatures between about 13° C. and 28° C. during a consecutive span of about 3-7 days appear to work well while temperatures above about 35° C. may be less effective.

In addition to oxygen and temperature, the corrosion rate also depends on the flow rate of liquid over the plate. A fluid (e.g. must or juice) in relative motion (e.g. extension of blade) to a surface (e.g. plate attached to blade) can be defined by calculating the Reynolds number (Re). As shown in the mathematical formula below, this definition generally includes the fluid properties of density and viscosity, plus a velocity and a characteristic dimension, such as the length and width of the plate used. For fluids of variable density, such as must or juice, special rules may apply. The velocity can also be a matter of convention in some circumstances, notably in stirred fermentation vessels. A gradual increase in the corrosion rate corresponds with an increasing Reynolds number. The geometry of a system (e.g. flat plates, stirrers, pipes), have a pronounced effect in determining the influence of Reynolds number on the corrosion rate. Still, Reynolds number, as a corrosion parameter, permits useful generalizations and comparisons with other correlations. Empirical evidence suggests that the surface of the copper plate, in use, undergoes relatively uniform corrosion at least between about Re=1-9K at which value the corrosion rate may be near optimal. In all cases, the plates lost their characteristic copper luster due to the corrosion process. Furthermore, Reynolds number increases the corrosion rate depending on temperature. At a particular temperature, the corrosion rate increases with Reynolds number. Temperature increases the corrosion rate for high to moderate values of Reynolds number. At low Re values, the effect of temperature seems to depend primarily on oxygen solubility. A basic approximation of the flow rate over the plate is generally described by the equation:

$$Re = \frac{\rho v L}{\mu} = \frac{vL}{\nu}$$

where:

v is the mean velocity of the object relative to the fluid (SI units: m/s)

L is a characteristic linear dimension (m)

$\mu$ is the dynamic viscosity of the fluid (Pa·s or N·s/m² or kg/(m·s))

$\nu$ is the kinematic viscosity ($\nu=\mu/\rho$) (m²/s)

$\rho$ is the density of the fluid (kg/m³)

Re is the Reynolds number

Formulae used to ascertain the estimated rate of corrosion on the plate, based on flow rate and other parameters, can be further derived by those of ordinary skill in the art.

FIG. 4A shows the oblique angle 8 of the blade 6. The shaft 2 (not shown) and sleeve 12 are essentially perpendicular to the floor 14 of the fermentation vessel. The angle 8 of the blade 6, relative to the sleeve 12 (or shaft 2), is preferably between about 25 and 85 degrees, more preferably 45 degrees. This angle is advantageous for many reasons. First, experimentation suggests that the hydrodynamic design of the blade significantly reduces the resistance created when the blade penetrates the solid cap material. The cap material is deformed from the stress applied to the cap when the blade is extended downward. As the blade moves through the viscous juice, it does not sacrifice mechanical mixing efficiency. This blade design allows thorough vertical as well as significant horizontal mixing of substances that have different phase forms, densities and/or viscosities with reduced mechanical or physical effort. The reduced effort is attributed, at least in part, to the relatively low fluid stress and ease of movement (i.e. fluidity) during the application of a force of sufficient magnitude and direction to extend the blade downward into the cap material. FIGS. 4A through 4C show examples of blade shapes in accord with certain embodiments of the invention. The blade(s) can be circular, oval, square, rectangular, triangular or any other desired shape. Preferably, a rectangular shape is deployed.

The apparatus is also easy to lift out of the fermentation vessel because the drag on the obliquely-angled blade is reduced. Furthermore, the solid components slide off the top of the blade which further facilitates movement of the apparatus to other locations around the fermentation vessel. This reduces the physical strength otherwise required during repetitive manual mixing at one or multiple locations in the fermentation vessel, for example.

Perhaps most significant, oblique angle 8 of the blade 6 has been found surprisingly efficient for gentle mixing of cap material with juice to optimize desirable attributes including organoleptic characteristics (e.g. aroma, mouthfeel and taste) that oenophiles cherish and wine critics admire. Desirable chemical compounds extracted from grape seeds and skins, particularly during the fermentation of Pinot Noir, Pinot Menuier, Pinot Gris, Traminer and other delicate varietals of *Vitis vinifera*, benefit from this careful and targeted mixing. Gentle mixing is facilitated by the leading edge of the blade slicing through the solid cap material and slowly submerging the cap from the top of the fermentation vessel and relocating this material in an essentially horizontal movement under the cap adjacent to the blade with limited splashing and controlled, often minimal, oxygenation. Observations suggest that mixing even in the absence of aeration can be stimulatory to yeast, perhaps because it distributes toxic end products more evenly preventing localized accumulation. Mixing can also bring yeast in contact with nutrients again by distributing the yeast more uniformly in the vessel. This provision of nutrients may be stimulatory if nutrients are limiting. This method often leaves the cap partially to substantially intact as it is submerged and relocated in a soft, fluent, lithe manner. This sequence is generally illustrated in FIGS. 15A through 15D, for example. The blade angle also prevents seeds or other solid material from being inadvertently crushed between the plate 7 surface and the bottom floor 14 of the fermentation vessel because the oblique angle of the blade is on a plane that is not parallel to the horizontal floor of the fermentation vessel when the shaft is positioned perpendicular to the fermentation vessel floor 14 in use. This is depicted in FIG. 4A. Because seeds cannot be crushed by the apparatus against the bottom of the vessel, the apparatus design prevents the release of harsh tannins even when the apparatus is used aggressively or operated by inexperienced personnel.

Figure 5:
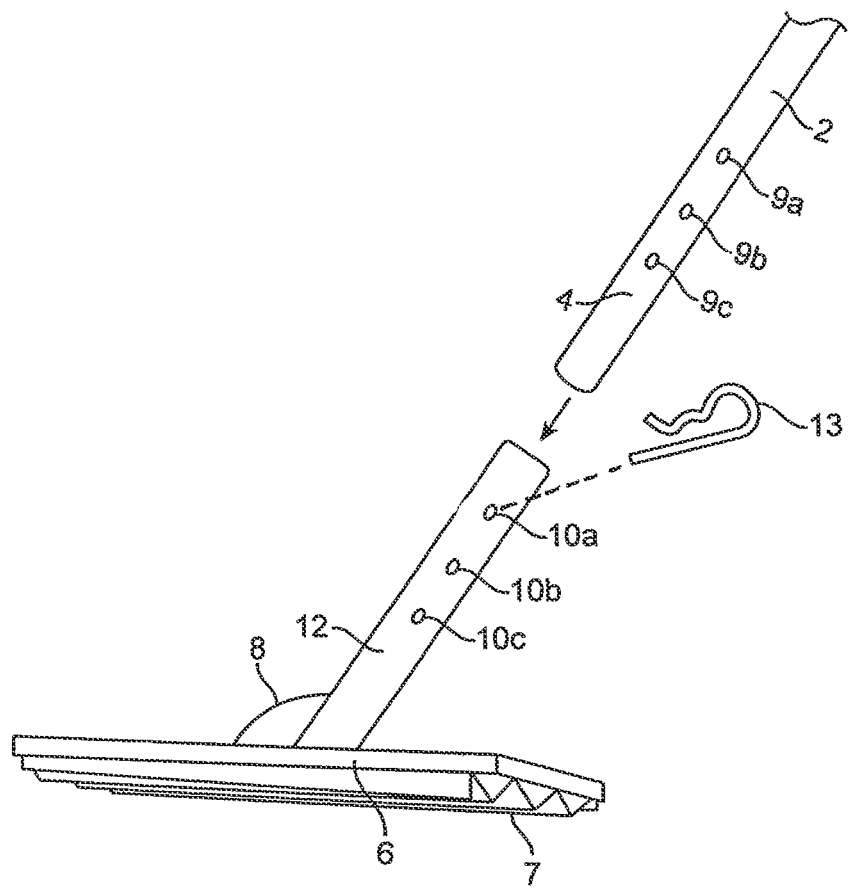
FIG. 5 is a perspective side view of a portion of the partially-disassembled apparatus of FIG. 2.
Figure 14:
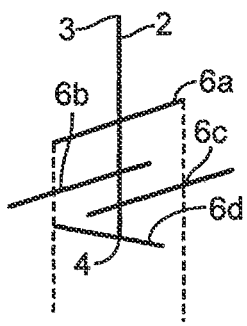
FIG. 14 is a diagram showing a plurality of axially offset blades in accord with certain embodiments of the invention.
Figure 15A:
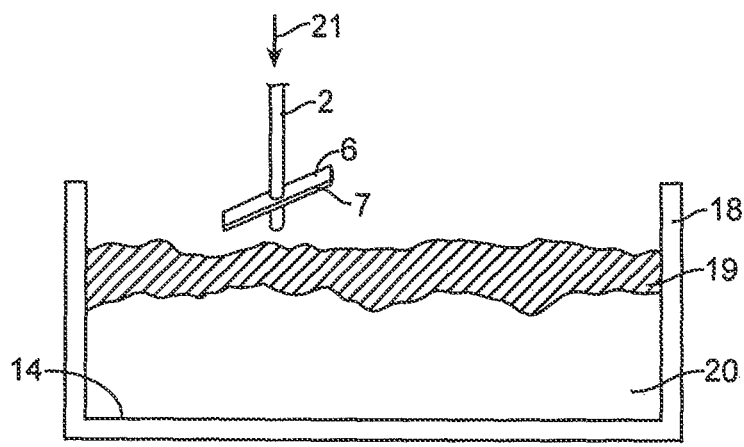
FIGS. 15A through 15D are diagrams depicting a sample sequence to regulate parameters in cap material and juice during primary fermentation in accord with certain embodiments of the invention.
Figure 15B:
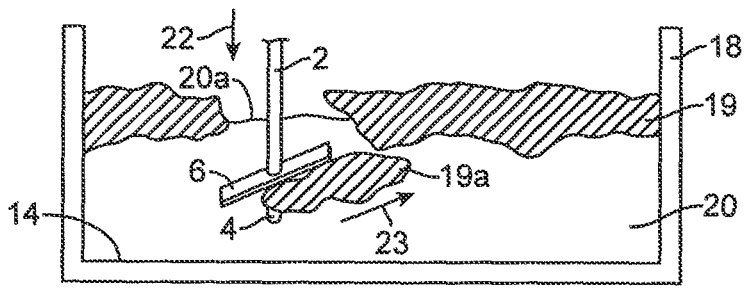

FIG. 5 is a perspective side view of the apparatus showing the blade 6 detached from the second end 4 of the shaft 2. In this embodiment, the position of the blade along the shaft is adjustable. The second end 4 of the shaft 2 is inserted in the sleeve 12 until one or more holes 9a, 9b, and 9c align with one or more corresponding holes 10a, 10b and 10c on the sleeve 12. When the hole(s) are aligned, a cotter pin 13, rod, tie, screw, or similar hardware is inserted through at least one corresponding hole(s) to secure the shaft 2 to the blade 6. It is further contemplated that additional holes can be added to allow for increased adjustment breadth. The second end 4 of the shaft 2 may pass through apertures 15a (in the blade 6) and 15b (in the plate 7) to extend beyond the blade 6 and plate 7, respectively (as shown in FIGS. 6, 9A-9B, 10A, 11A, 11C, 12A-12B, 13A-13C, 15A-15D). In this manner, second end 4 may prospectively serve as a pilot hole to anchor the apparatus in the cap and guide the blade through hardened cap material (as shown in FIGS. 15A and 15B). Alternatively, the second end 4 of the shaft 2 may not extend beyond the blade 6 and plate 7 (as shown in FIGS. 2, 3, 4A-4C, 5, 7, 10B, 11B, 17A-17C), for example. FIG. 14 is a hybrid configuration in that it includes the second end 4 of the shaft 2 extending distally beyond blades 6a, 6b and 6c but not extending beyond blade 6d.

Figure 6:
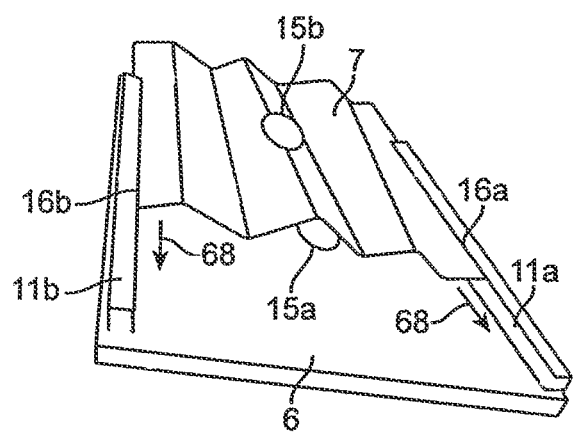
FIG. 6 is a view showing the underside of the blade and plate attachment of the apparatus of FIG. 2.
Figure 7:
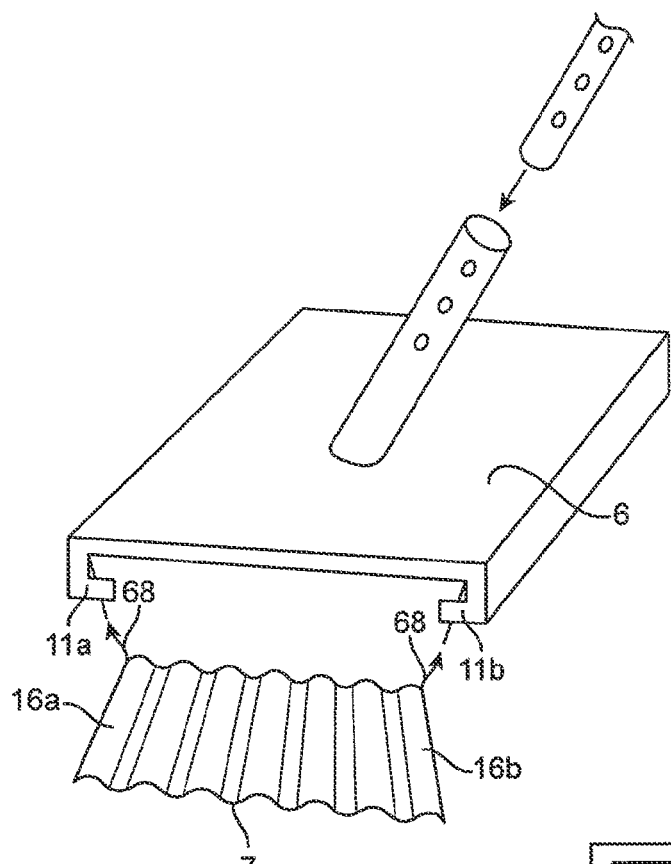
FIG. 7 is an exploded view of a portion of the apparatus of FIG. 2.

FIG. 6 is a view showing the underside of the blade 6 and plate 7 attachment configuration. In this example, grooves 11a, 11b are positioned parallel to each other on opposite sides of blade 6 to engage each edge 16a, 16b of plate 7, respectively. Accordingly, plate 7 is slid (shown by arrow 68, for example) along the underside of blade 6 with grooves 11a and 11b guiding the insertion and holding plate 7 securely in place. In this manner, apertures 15a and 15b are aligned when plate 7 is fully inserted into position. This mode of attaching plate 7 to the blade 6 allows for convenient interchangeability of noble metal or oxidative metal plates depending on the type of undesirable matter to be mitigated. The method of attachment may remain essentially the same when, alternatively, the second end 4 of the shaft 2 does not extend beyond the blade 6 and plate 7 as shown in FIG. 7. Of course, there are many other methods that can be similarly employed to attach the plate 7 to the blade 6 including clamps, screws, bolts, adhesives, VELCRO®, and the like; therefore, the invention described herewith is not necessarily limited to the specific attachment example described above.

Figure 8A:
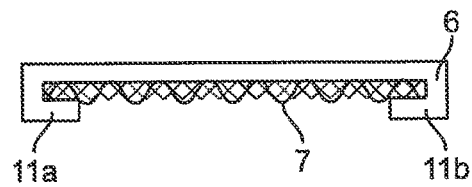
FIGS. 8A through 8C are front views showing examples of the plate configuration with optimized surface areas according to certain embodiments of the invention.
Figure 8B:
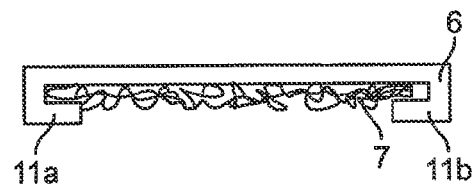
Figure 8C:
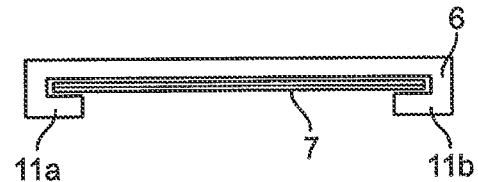

When mitigating undesirable matter, increasing the surface area of plate 7, which contacts the solid and liquid botanical components, adds efficiency to the process by increasing the number of chemical reactions per area unit thus reducing the duration of time the plate needs to contact the ferment. The deposition of sulfide adhering to the surface of a copper plate, for example, occurs according to a logarithmic scale of deposit. Therefore, an increased surface area aids the reaction. Similar surface area considerations also apply to a plate made of a noble metal. Although plate 7 can be a simple sheet or panel configuration, as shown in FIG. 8C, plates of other configurations with essentially the same length and width dimensions can be used to effectively increase the reactive surface area. Examples may include corrugated, mesh or wool designs as shown in FIGS. 7, 8A and 8B, respectively. Other examples may include dimpled, screened or rippled plate patterns and the like. Reversing the chemical reaction on the corroded/tarnished plate after contact with the biological components is accomplished by various methods well known to persons having ordinary skill in the art. This process is sometimes referred to as "recharging" or "refreshing" the plate. Wiping the plate with a salt and vinegar solution or with apple juice are convenient ways to quickly remove tarnish from the plate.

FIG. 9A shows an alternative attachment for apparatus 200. In this embodiment, the first end 3 of the shaft 2 contains threads 18 to facilitate secure attachment to auxiliary equipment, such as machinery for automated use with multiple fermentation vessels and large scale operations. Of course, many other means of attachment are also possible beyond this example.

Alternatively, the first end 3 of the shaft 2 of apparatus 300 includes a handle 19 for grasping the device. In this aspect, as shown in FIG. 9B, the handle 19 aids in the manual manipulation of the apparatus, particularly during pushing the apparatus downward into the cap material and pulling the apparatus upward at least partially out of the cap material. In use, the handle facilitates the downward and upward motion of the apparatus 300. A worker may choose to also hold the middle section 5 with their opposite hand to position the shaft 2 above the solid component in a substantially vertical orientation relative to the solid component. Various other attachments may be used including a hole 17 located at the first end 3 of apparatus 100, as shown in FIG. 2, which may be used to suspend the apparatus off the ground or facilitate drying after the apparatus has been sanitized, for example.

FIG. 10A shows a perspective view of the blade 6 adjustably positioned along the length of the shaft 2. This configuration is similar to FIG. 5, which shows the blade 6 detached from the second end 4 of the shaft 2, except FIG. 10A shows the blade positioned along the shaft 2 with the second end 4 passing through apertures 15a, 15b (not shown in this perspective) to extend beyond the blade 6 and plate 7 in this particular embodiment of the invention.

Figure 10B:
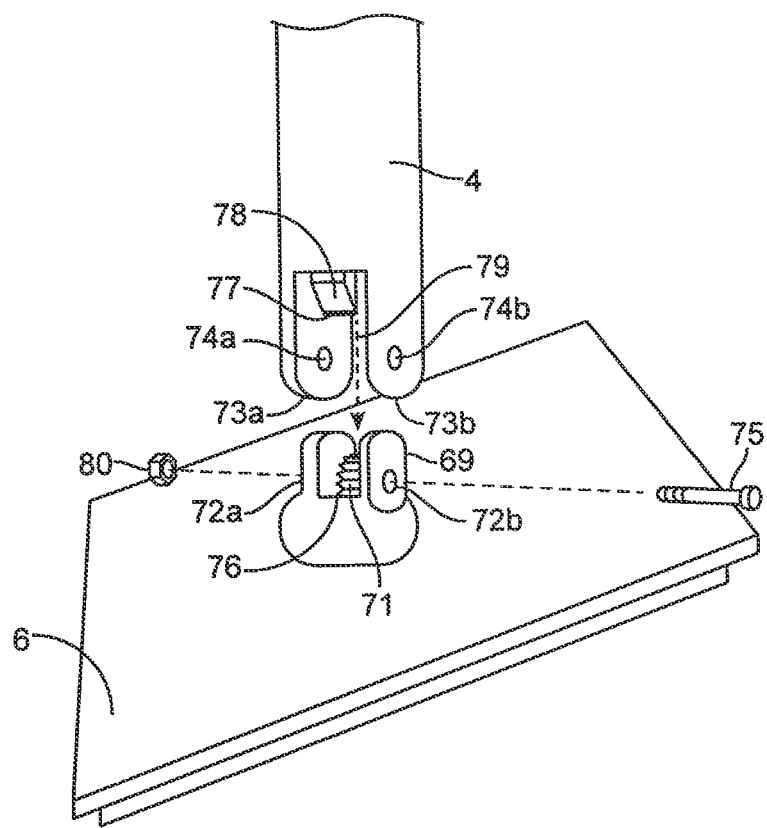
FIG. 10B is a perspective view showing a mechanism for adjusting the angle of a blade relative to the shaft in accordance with one embodiment of the invention.

FIG. 10B shows a perspective view of a mechanism for adjusting the angle of a blade relative to the shaft in accordance with certain embodiments of the invention. An angle adjustment member 69 is attached to blade 6. The second end 4 of shaft 2 can be attached to the angle adjustment member 69 at the center of blade 6 (FIGS. 11A and 11B) or the angle adjustment member 69 can be attached offset from the blade center as shown in FIG. 11C, for example. The angle adjustment member 69 has a free end having a channel 71 extending therein. The angle adjustment member 69 also has a pair of opposed holes 72a, 72b therein extending into the channel 71. A pair of protruding members 73a, 73b are integrally coupled to and extend away from the second end 4 of the shaft 2. The protruding members 73a, 73b are spaced such that each of the protruding members may be positioned on an opposite side of the angle adjustment member 69 to define a saddle for the angle adjustment member 69 to sit in as shown by arrow 79. Each of the protruding members 73a, 73b has bores 74a, 74b passing through them. Each of the bores 74a, 74b correspond with one of the holes 72a, 72b in the angle adjustment member 69 such that a bolt 75 can be extended sequentially through the bore 74b, hole 72b, hole 72a and bore 74a when the holes and bores are aligned in use, such that the protruding members 73b, 73a are pivotally coupled to the angle adjustment member 69. The bolt 75 is secured in place by nut 80 on the opposite side of the angle adjustment member 69. It will be understood that various fasteners, not necessarily limited to a bolt and nut configuration, can also be used to fasten the angle adjustment member 69 to the second end 4 of the shaft 2. The second end 4 of the shaft 2 and a selected oblique blade angle are locked into place with respect to the blade 6 such that the two are not pivotable with each other when locked. The locking means includes a gear 76 which is securely attached to the angle adjustment member 69 and positioned in the channel 71. The gear 76 has a plurality of teeth thereon. The lower edge 77 of a wedge 78 attached to the second end 4 of the shaft 2 engages the gear 76. The angle of the blade 6 can be adjusted by positioning the blade at a desired oblique angle, engaging the lower edge 77 between two teeth of gear 76, and fastening the nut and bolt to hold the angle securely in place. To change the blade angle (i.e. to select a new oblique blade angle), the nut and bolt can be loosened and the edge 77 of wedge 78 can be repositioned between two teeth at another location around the circumference of gear 76. Multiple blades can be added or linked together with the addition of other angle adjustment members 69 attached to the shaft 2 between the first end 3 and the second end 4, for example.

Figure 11A:
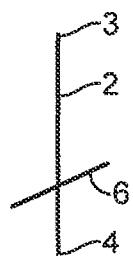
FIGS. 11A through 11C are diagrams showing examples of blade placement locations along the shaft in accord with certain embodiments of the invention.
Figure 11B:
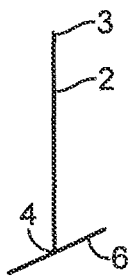
Figure 11C:
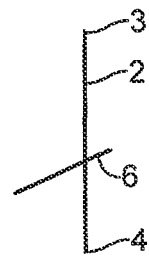

FIGS. 11A through 11C are basic diagrams showing a few of the many examples of single agitation blade 6 placements along the shaft 2 of the apparatus. It is understood that these blade placements can be fixed or adjustable along the shaft as previously described and that the angle of the blade can also be adjusted as shown in FIG. 10B. Blade 6 may optionally be removable from the shaft or permanently affixed to the shaft 2. In either case, the blade is attached between the first end 3 and the second end 4 of the shaft 2. As previously described, the plate (not shown) can be positioned under the blade. The shaft 2 may attach to the blade 6 at the center of the blade (FIGS. 11A and 11B) or the shaft 2 may be attached offset from the blade center (FIG. 11C), for example. In all cases, the blade is attached to the shaft at an angle other than perpendicular or parallel to the shaft (i.e. an oblique angle).

Figure 12A:
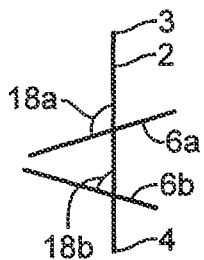
FIGS. 12A and 12B are diagrams showing examples of multiple blade angles and placements along the shaft in accord with certain embodiments of the invention.
Figure 12B:
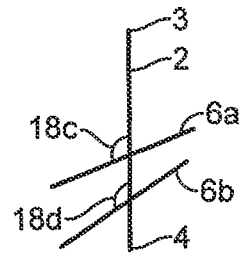

FIGS. 12A and 12B illustrate a few examples of multiple blade angles and placements along the shaft 2 in accordance with embodiments of the invention. FIG. 12A shows a first blade 6a attached to the shaft 2 at a first location at oblique angle 18a. A second agitation blade 6b is attached to the shaft 2 at a second location (different from the location of the first blade 6a) between the first end 3 and the second end 4 of the shaft 2. The second blade 6b is disposed at a second oblique angle 18b to the shaft 2. The angle of the second blade 6b can be the same or different from the angle position of blade 6a. In this particular example, angle 18a is an obtuse angle and 18b is an acute angle. FIG. 12B is a similar example in that two blades are shown attached to the shaft 2 except in this case, angles 18c and 18d are both obtuse angles. Many other combinations of oblique angles (both acute and obtuse) may be used with two or more blades. Furthermore, the blades may or may not be parallel to each other.

Figure 13A:
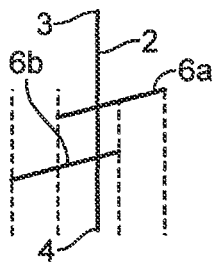
FIGS. 13A through 13C are diagrams showing multiple blade alignment configurations relative to the shaft in accord with certain embodiments of the invention.
Figure 13B:
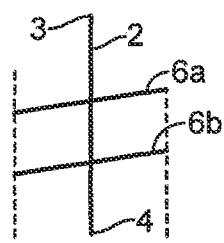
Figure 13C:
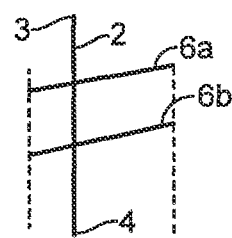

FIGS. 13A through 13C are diagrams showing a few examples of multiple blade configurations according to various aspects of the present invention. FIG. 13A shows the first agitation blade 6a and second agitation blade 6b both circumferentially offset from the shaft 2 (as indicated by dashed lines parallel to the shaft 2). In this example, the blades 6a, 6b are also both axially offset since the shaft 2 is connected to the blades at a location other than the center of the blades. FIG. 13B shows an alternative configuration where blades 6a and 6b are in circumferential and axial alignment. FIG. 13C illustrates blade 6a in circumferential alignment with blade 6b. In this example, both blades are axially offset from the shaft 2.

FIG. 14 is a diagram showing an example of a plurality of blades 6b, 6c, 6d axially offset from the shaft 2 while blade 6a is axially aligned with the shaft 2. None of the blades in FIG. 14 are circumferentially aligned with one another (as indicated by dashed lines parallel to the shaft 2). As can be appreciated, many other combinations of multiple blade placements with respect to the position on the shaft and/or relative position to one another are also possible. Some of the advantages of having multiple blades include versatility to adjust mechanical mixing protocols and efficiency to regulate the relative rate of chemical or biological reactions occurring on the plates attached to the blades. For example, in the event that reduced sulfur compounds and harmful bacterial are simultaneously present in the same fermentation vessel, blades 6c and 6d can be fitted with copper-based (or other oxidative metal) plates to contact yeasts in the juice below the solid cap material while blades 6a and 6b can be fitted with silver-based (or other noble metal) plates to primarily contact the solid cap material where harmful bacteria are more likely to reside. Alternatively, a single plate 7 can contain areas of oxidative metal and areas of silver or noble metal. Multi-blade configurations also increase the turbulent flow regime as the apparatus is extended downward to a depth in the fermentation vessel. This can be advantageous if additional oxygenation is needed, for example.

FIG. 15A depicts the beginning of a sequence for a method to regulate parameters in cap material and juice during primary fermentation. In use, the shaft 2 of the apparatus 300 (not completely shown) is held in a substantially vertical orientation at a location 21 above a vessel 18 containing the cap material 19 and the juice 20.

FIG. 15B shows the apparatus extending downward 22 to a predetermined depth in the vessel. In this example, the blade is extended completely through the cap material 19 and below the juice level 20a. The blade 6 and plate 7 contact the cap material 19 for a duration of time. As previously mentioned, one advantage of the oblique angle of the blade is that it at least partially submerges and horizontally moves 23 the cap material 19a under the juice 20.

Figure 15C:
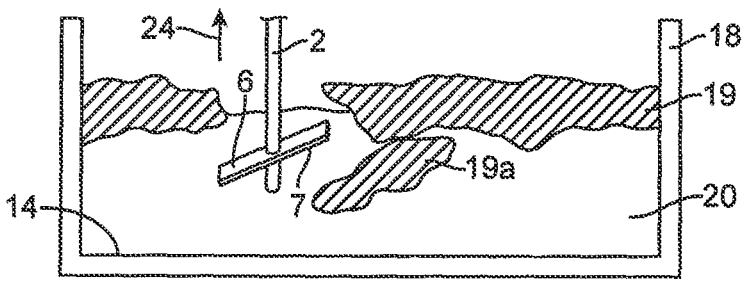
Figure 15D:
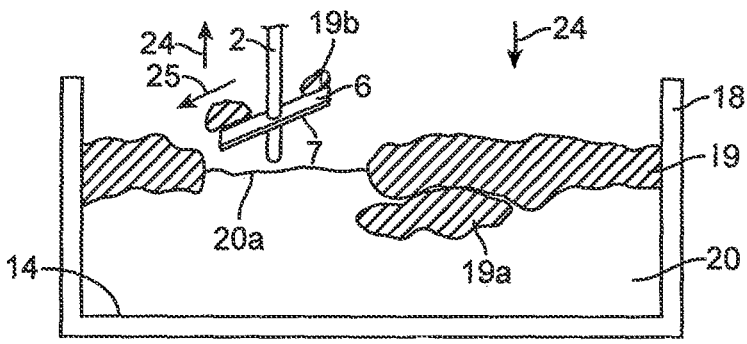

As shown in FIG. 15C the apparatus is retraced (i.e. retracted) upward 24 after a duration of time to cause the blade to rise at least partially above the cap material (FIG. 15D). Another advantage of the oblique angle of the blade is that it allows any cap material 19b that may collect on the top of the blade during the upward stroke (i.e. retraction) of the apparatus to slide off 25 the blade 6 and back into the fermentation vessel 18 as the apparatus is lifted 24 at least partially above the cap material 19.

The sequence illustrated in FIGS. 15A through 15D can be repeated any number of times at the same location 21 by producing a reciprocal motion to repeatedly mix the cap material with the juice. After the step shown in FIG. 15D is completed, the shaft 2 of the apparatus can be repositioned at another location 24, for example, over the vessel 18 and the steps can be repeated according to a schedule to regulate parameters during alcoholic fermentation.

Figure 16A:
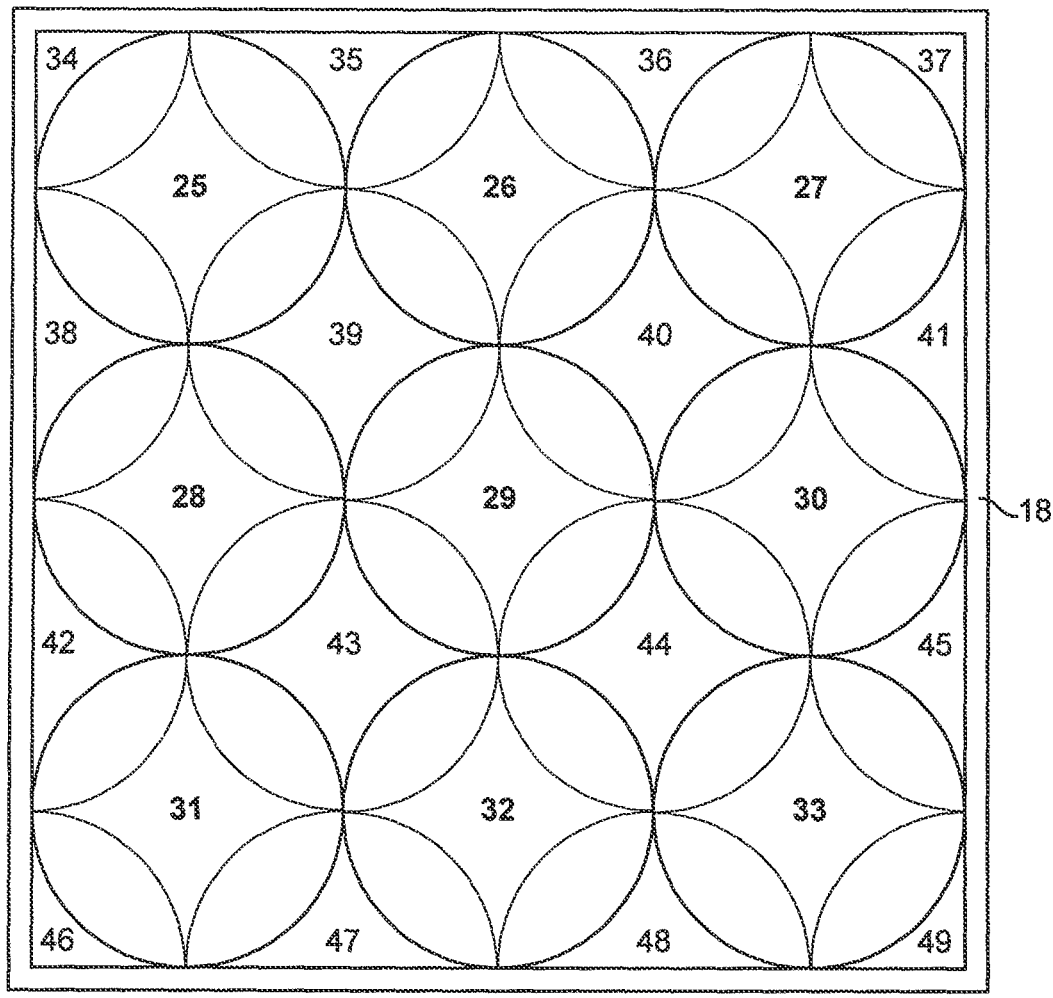
FIG. 16A is a top schematic view of a fermentation vessel with demarcated regions of cap material according to various embodiments of the invention.

FIG. 16A shows an example of cap material above a fermentation vessel 18. The fermentation vessel can be a closed system although an open top fermentation vessel is preferred as shown in FIGS. 15A-15D and 17A-17C. In this example, the overlapping locations of cap material have been demarcated with numerals 25-49. Primary locations are indicated by numerals 25-33. Of course, the locations can be designated in larger or smaller areas and do not necessarily need to overlap or be demarcated (i.e. mapped) in a circular fashion. Experience shows, however, that even when a rectangular blade is used, the cap material and juice assume a generally circular or oval appearance (i.e. conformation) post-extension.

Figure 16B:
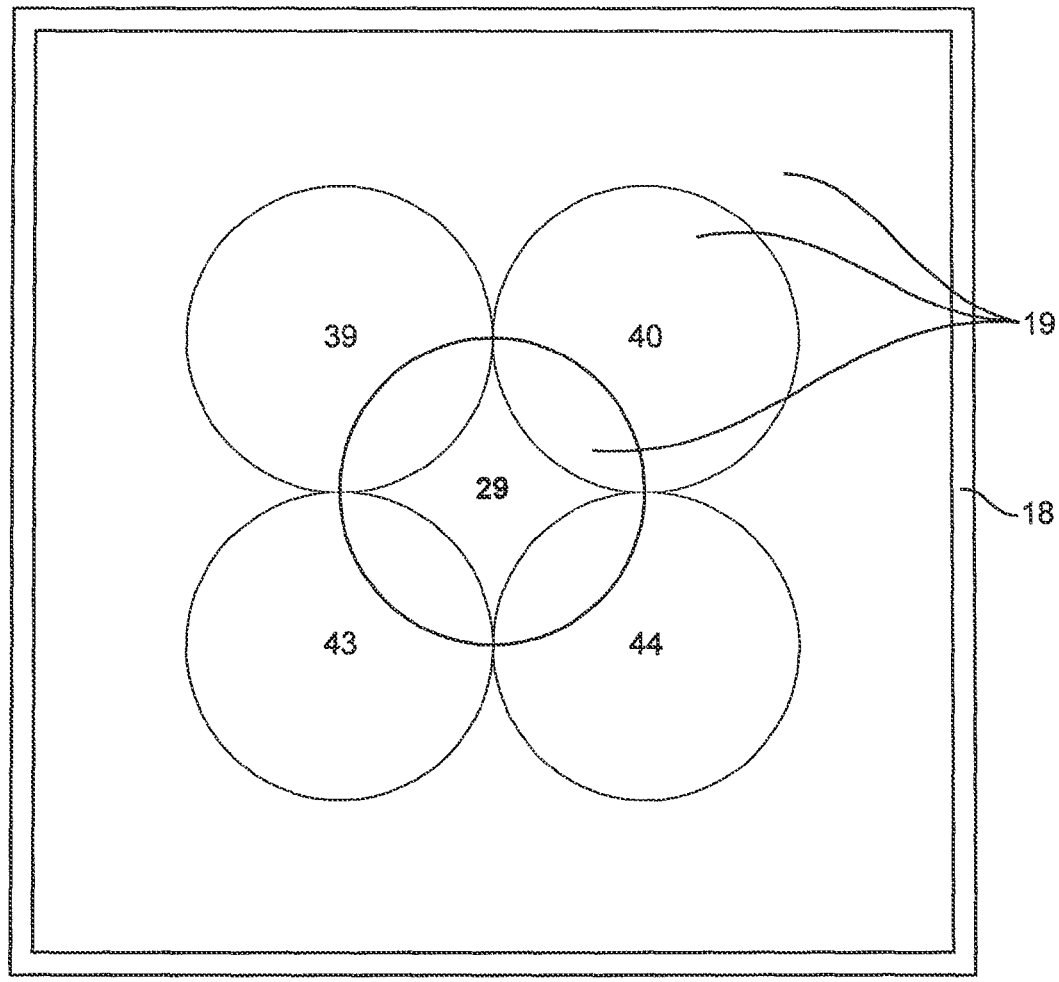
FIG. 16B is a top schematic view of a fermentation vessel showing an example of specific regions of cap material targeted according to the regulation of parameters shown in FIG. 16C in accord with certain embodiments of the invention.

FIG. 16B is a top view of a fermentation vessel 18 showing an example of specific regions of cap material 19 demarcated according to the regulation of parameters shown in FIG. 16C. This example may be used to target and manage cap material for a delicate varietal, such as Pinot Noir, that has been harvested during a good vintage as generally defined by ripe fruit, mature seeds, acceptable brix, bright acidity and sturdy tannin structure.

FIG. 16C is a table listing an example of a schedule for regulating parameters in cap material and juice during primary fermentation. Essentially, FIG. 16C serves as a plan to manage cap material at the locations outlined in FIG. 16B. This particular example calls for 14 total extensions and retractions of the apparatus at 5 distinct locations 29, 39, 40, 43, and 44. Note that location 29, located in the center of the fermentation vessel 18, is visited once at the beginning of the mitigation plan to manage cap material and also again at the end of the plan. This example includes a relatively small number of extensions and retractions at each location. The relative duration and depth of each extension shown in FIG. 16C is also relatively conservative, particularly when compared with the more aggressive plan shown in FIG. 16E. The schedule shown in FIG. 16C is designed to produce a feminine style of wine (i.e. less extraction and lighter body) while keeping reduced sulfur compounds in check using a plate of copper or other oxidative metal. In this example, the plate is used primarily in a preventative or prophylactic mode but can be employed in a curative manner in the event reduced sulfur compounds are detected during the fermentation monitoring. A curative approach may include adding additional blades and copper plates and/or modifying the schedule as further described below. In the event harmful bacteria arise during fermentation, this hypothetical plan can be easily modified to include a plate composed of a noble metal, for example. The schedule (i.e. plan) can be completed or subsequently modified to include at least one of the following variables: a) the location of the shaft of the apparatus above the vessel (i.e. fermentation vessel location); b) the relative depth the apparatus is extended downward into the vessel (i.e. depth); c) the duration of time the blade and plate contact the cap material (i.e. duration); d) the number the extending and retracting steps are repeated (at a given location); and e) the location the shaft of the apparatus is repositioned over the vessel (i.e. fermentation vessel location).

Thus, the schedule of FIG. 16C calls first for 3 extensions of the device at location 29 (in the center of the fermentation vessel 18) using an oxidative metal plate with each extension penetrating the cap to a relatively medium depth. Each extension and retraction will last 4 seconds (which corresponds to the time the plate is in contact with cap and juice). After this time, the apparatus will be repositioned to the next location. In this example, the next location is location 39 where 2 extensions will be completed to a shallow depth with each extension lasting 3 seconds.

Figure 16D:
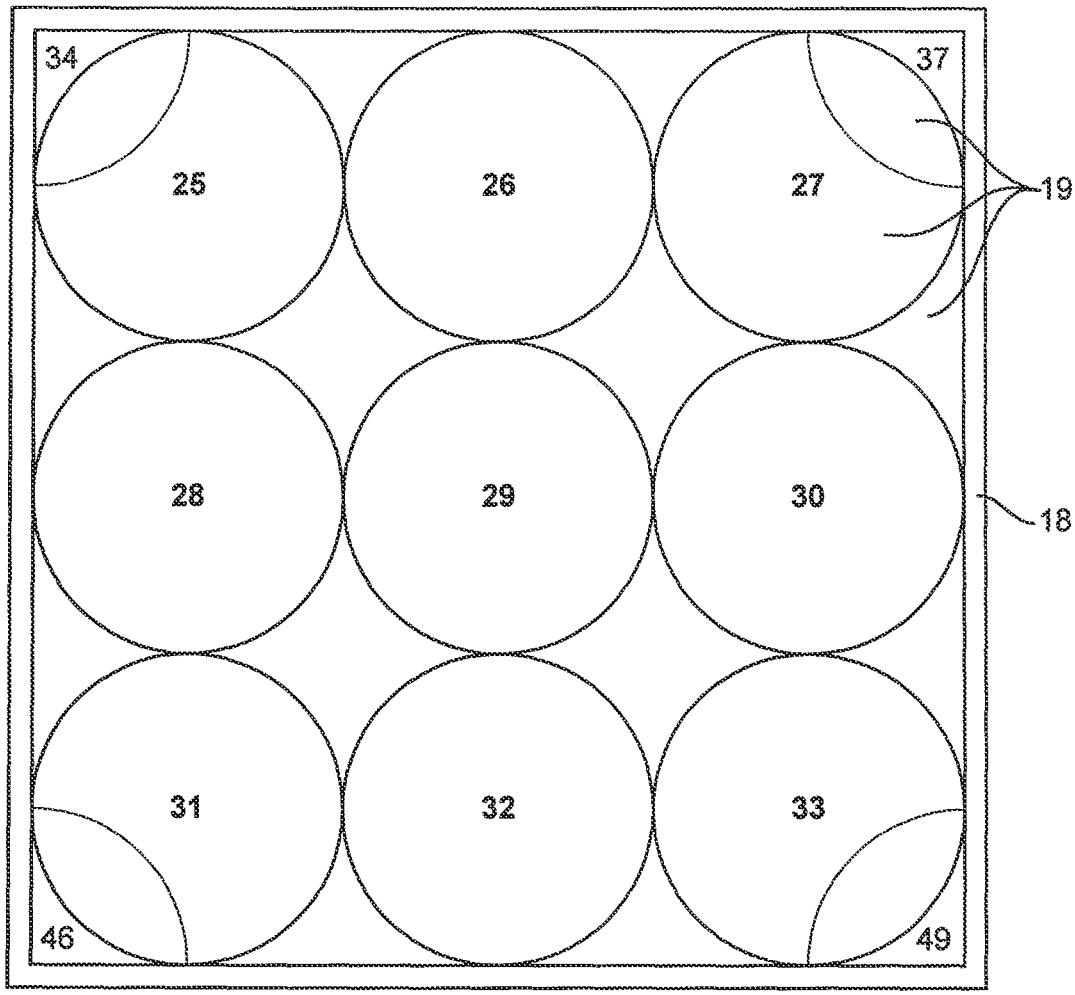
FIG. 16D is a top schematic view of a fermentation vessel showing another example of specific regions of cap material identified according to the regulation of parameters shown in FIG. 16E in accord with certain embodiments of the invention.

Turning now to FIG. 16D, a different example of specific regions of identified cap material 19 is shown. The corresponding table (FIG. 16E) includes a schedule of regulating parameters in cap material and juice. FIG. 16E is more rigorous than FIG. 16C in that it calls for longer, more numerous and deeper extensions of the apparatus using a combination of different plate types. This schedule may be preferred for a hardy, thick-skinned varietal such as Syrah or Cabernet Sauvignon where a more masculine, ageable wine style is anticipated or desired. Generally, the more extensions and retractions of the apparatus over more locations can be expected to yield a more masculine wine style including a more extracted, concentrated and full-bodied wine with dark opaque colors and firm tannins. In this hypothetical example, the grapes may have been harvested during a vintage that received warm weather with rain during harvest. The schedule shown in FIG. 16E calls for a larger number of extensions and retractions using a plate made of noble metal particularly at middle and corners of the fermentation vessel 18 where microbes tend to first colonize. This suggests that mitigation of mold and/or mildew (i.e. multicellular fungi) and/or *acetobacterium* (i.e. harmful bacteria) is a major concern given the late season rain. Molds are intolerant to alcohol, so mitigation of mold is usually a main consideration during the early stages of primary fermentation when alcohol levels are the lowest. Some oxidative metal plates are also employed as prophylaxis against reduced sulfur compounds since Syrah is especially prone to this condition during fermentation.

In addition to vintage, the vineyard may influence the mitigation plan to manage cap material. Vineyards with lower yields and smaller berries may benefit from less extensions for shorter durations. Alternatively, more extensions for longer durations may add richness to wine made from grapes possessing high acidity, for example.

Figure 17A:
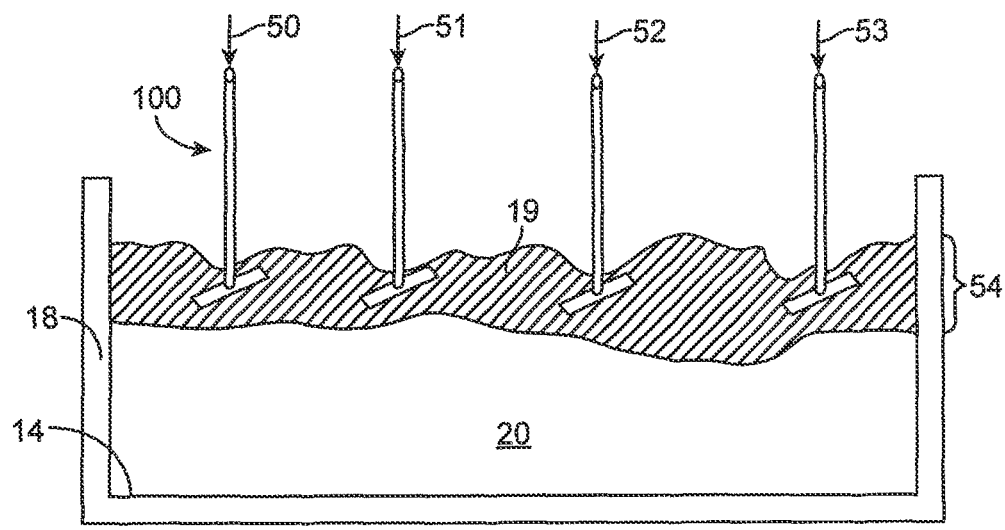
FIGS. 17A through 17C are diagrams showing various depths the apparatus is extended downward into the fermentation vessel according to certain embodiments of the invention.

FIG. 17A shows examples of a relatively shallow depth when the apparatus 100 is extended partially into the solid cap material 19 at various locations 50-53 in the fermentation vessel 18. A shallow depth, as described herewith, is a depth 54 that does not extend beyond the cap 19 into the juice 20 (i.e. the apparatus does not penetrate the bottom of the cap material).

Figure 17B:
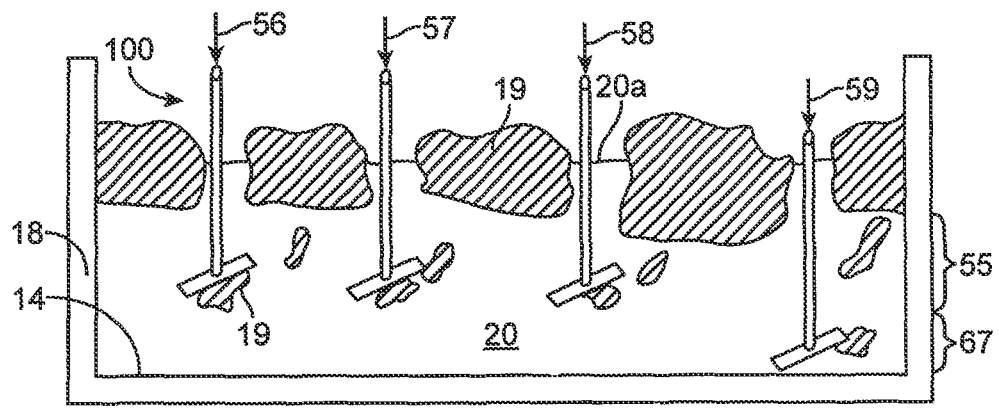

FIG. 17B shows the apparatus extended past the shallow depth to penetrate completely through the sold cap material 19 at various locations 56-59 in the fermentation vessel 18. In this example, apparatus 100 at location 59 extends to the deepest depth 67 contacting the bottom 14 of the fermentation vessel 18. The angle of the blade prevents the cap material, some of which may adhere to the plate located under the blade, from being crushed against the bottom 14 of the vessel 18. Location 59 is defined as a deep 67 extension and locations 56-58 in FIG. 17B are defined as relatively medium depth 55 extensions of the apparatus 100.

Figure 17C:
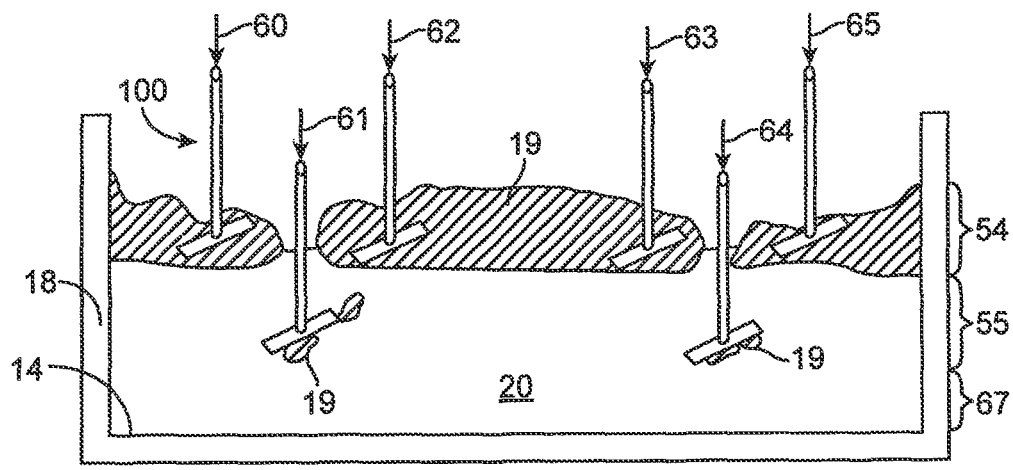

Finally, FIG. 17C shows a combination of shallow depths 54 (at locations 60, 62, 63, and 65) and medium depths 55 (at locations 61 and 64) that the apparatus 100 is extended downward into the fermentation vessel 18 according to embodiments of the current invention. For purposes of example and in specific reference to FIGS. 16C and 16E, the relative depth variables are shallow 54, medium 55 and deep 67.

The depth of extension is not an insignificant consideration, particularly in chemical and biological mitigation. For example, chemical conversion of sugar to alcohol by yeasts occurs primarily in the juice while harmful bacterial generally colonize in and around the solid cap material. Therefore, if reduced sulfur compounds are present, medium to deep extensions with a plate of oxidative metal is the best choice. If only $H_2S$ is present, the odor should be expected to dissipate relatively quickly (several minutes); however, if mercaptans have formed, the duration of time the plate contacts the juice should be prolonged (up to several hours in severe cases). If widespread bacterial contamination is the main issue requiring mitigation, numerous overlapping shallow extensions employing a noble metal plate is the best solution. If physical mixing to relieve a stratified fermentation is required, and there is no indication of reduced sulfur compounds, bacteria or multicellular fungi, a combination of numerous shallow, medium and deep extensions (without serious consideration of the type of plate to use) may be preferred.

The protocols described with respect to FIGS. 16A through 17C are easily followed by workers during manual operation of the apparatus to allow very specific optimization of attributes and mitigation of undesirable matter; however, these protocols can also be fully automated. It will be appreciated that the various methods and apparatus disclosed herein may be embodied in a machine-readable medium and/or a machine accessible medium compatible with a data processing system (e.g. a computer system) and may, therefore, be fully automated. Accordingly, the specification and drawings are to be regarded in an illustrative rather than restrictive sense.

Figure 18:
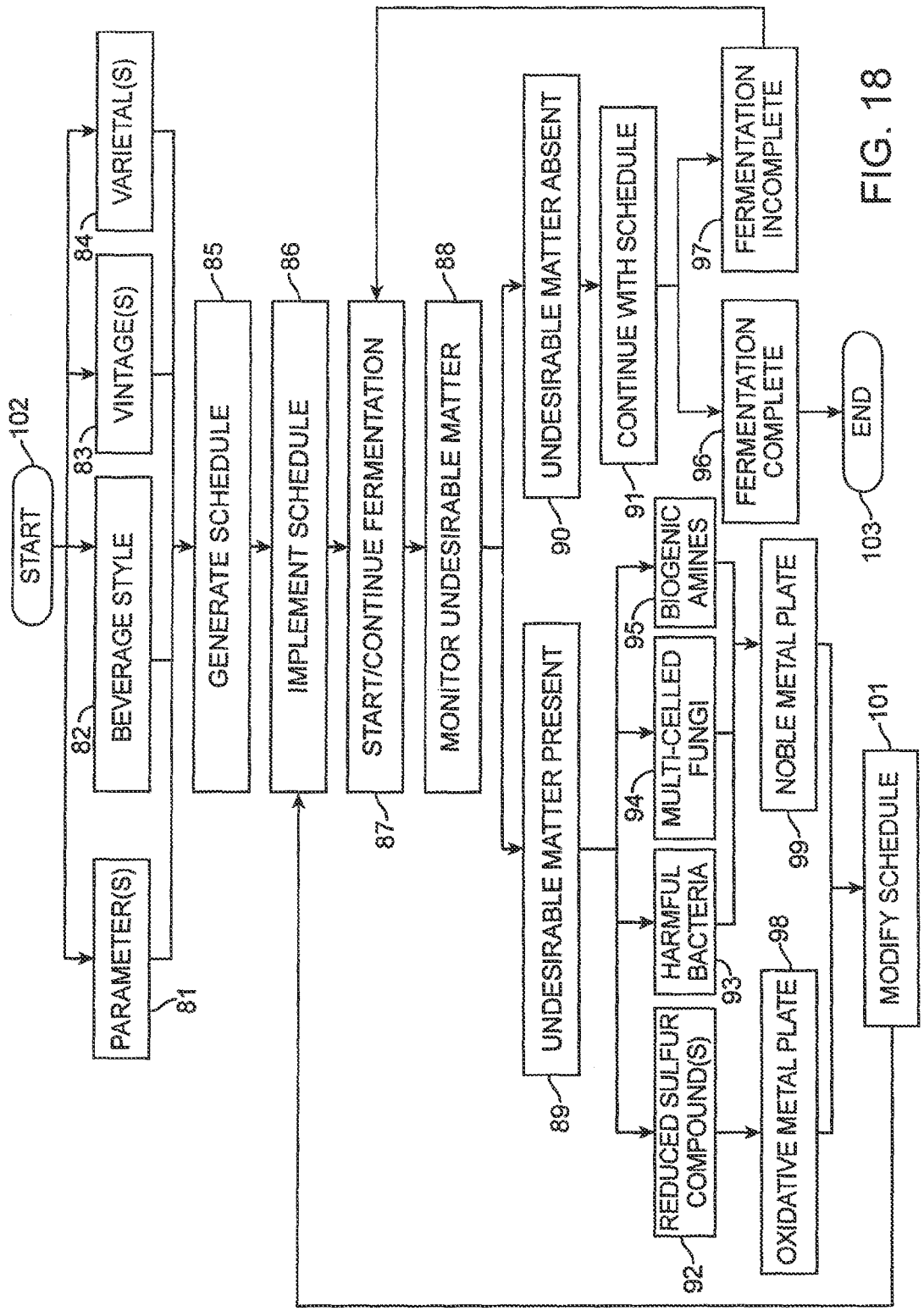
FIG. 18 schematically illustrates a flowchart and method of regulating parameters in a cap material and a juice during primary fermentation of an alcoholic beverage according to certain embodiments of the invention.

FIG. 18 schematically illustrates a method according to certain embodiments of the invention. In this example, the method can be used to regulate parameters in cap material and juice during primary fermentation of an alcoholic beverage. The method can be used with certain embodiments of the apparatus 100, 200, 300 as described. Several factors can be considered at the start 102 of the method including, for example, the varietal(s) to be fermented, the year(s) the grapes or other botanical component were harvested, the style of wine or other alcoholic beverage desired, and the parameter(s) at harvest. If wine is being made, selecting a varietal(s) 84 may include one or a combination of hybrids, clones or varieties of Pinot Noir, Pinot Menuier, Pinot Nero, Pinot Gris or any other botanical varietal or cultivar of *Vitis vinifera* as well as any other related species. If an alcoholic beverage other than wine made from grapes is to be created, the varietal(s) 84 can be any chosen plant species, hybrid, clone, variety or the like. Identifying one or more vintages 83 (i.e. the year(s) grapes were harvested) is also important because fluctuations in annual weather patterns affect the parameters at harvest and may influence the odds of undesirable matter appearing during the fermentation process. For example, if rain was present on or just before harvest, the moist grapes may be more prone to developing mold. This suggests a schedule conducive to the prevention of mold may be a prudent choice. It is further contemplated that several vintages may be combined (i.e. considered simultaneously). One or more parameter(s) 81 are measured including temperature, carbon dioxide, water, oxygen, pH, titratable acidity (TA), brix, yeast, nutrients, and/or alcohol. A desired beverage style 82 is also considered. In the case of wine, the style may be masculine, extracted, concentrated, feminine, restrained, and the like. Wine style is a subjective combination of color, bouquet, texture, and flavor as influenced by the grape variety or varieties used, the climate and soil conditions in the vineyard, and the method of vinification, for example. The balance of fruit, tannin structure, acidity and alcoholic strength coexist in a manner such that should any one aspect overwhelm or be diminished, then the fundamental nature of the wine will change. To create a characteristic enjoyable wine, balance is paramount.

Based on the considerations (81, 82, 83, 84) above, a predetermined schedule is generated 85. The predetermined schedule 85 can include at least one variable including: a) the horizontal location of the shaft of the apparatus 100, 200, 300 above the vessel relative to the cap; b) the vertical height of the plate above the cap; c) the depth the apparatus is extended downward into the vessel; d) the duration of time the blade and plate contact the cap material; e) the number the extending and retracting steps are repeated; and f) the horizontal location the shaft of the apparatus is repositioned over the vessel after step e) is conducted. The depth and duration may be relative or specific measurements. The predetermined schedule 85 can be determined manually or with the partial or complete assistance of a computer and/or algorithm, for example. Once the schedule 85 is determined, the schedule can be implemented 86 and fermentation can commence 87. The beginning of fermentation is particularly straightforward if a cold soak and/or inoculated yeasts are employed. Natural yeast fermentations, however, are prone to less control since fermentation can start spontaneously. For at least this reason, the predetermined schedule should be generated and implemented promptly.

As the schedule is set in motion 86 and the primary fermentation process begins 87, the fermentation can be monitored to determine if undesirable matter 88 is (or becomes) present 89. Undesirable matter may exist and become dominant at any time during fermentation so it is imperative to monitor continuously from the start 102 to end 103 of the exemplary method. If no undesirable matter is present 90, then the predetermined implemented schedule 86 proceeds 91 until the fermentation is complete 96 at which time the method concludes 103. Some examples that may indicate the completion of fermentation include inactive yeasts or no residual sugar if the beverage style 82 dictates a dry wine (i.e. the desired wine is fermented to dryness), for example. Note that brix, a measurement of sugar content, is one of the parameters that can be chosen according to certain embodiments of the invention.

If undesirable matter is found to be present 89 during monitoring, reduced sulfur compound(s) 92 can be specifically identified by various quantitative tests and procedures known to those of skill in the art. Reduced sulfur compounds, including carbon disulfide ($CS_2$), carbonyl sulfide (COS), and hydrogen sulfide ($H_2S$), are thermally oxidized to sulfur dioxide ($SO_2$), which can be collected in hydrogen peroxide as sulfate ion and analyzed according to the barium-thorin titration procedure, for example. Alternatively, simple qualitative tests, including smelling the fermentation for the presence of a rotten egg odor can also be used successfully to monitor reduced sulfur compounds.

In the event undesirable matter is detected (i.e. deemed to be present) and it is bacteria 93, monitoring can be accomplished with various quantitative tests and procedures known to those of skill in the art. Bacteriological monitoring, especially with respect to the levels of histamine production is important because there are seldom other biogenic amines 95 present where histamine is absent. Monitoring can be accomplished using liquid chromatography, for example. Histamine, can also be monitored using the procedure described by Held et al., *"Histamine Analysis in Wine Samples Using the Microplate Format" BioTek Instruments* (Aug. 29, 2006), http://www.biotek.com/resources/articles/histamine-microplate-format.html, for example.

Monitoring microbes effectively and efficiently during the winemaking process requires coordinating several different techniques. Examination with a phase-contrast microscope, testing using polymerase chain reaction (PCR) including quantitative PCR and Scorpions™ genetic chemical tests, culturing on various media, and other methods all have a place in today's wine microbe detection protocol. Amperometric biosensors have also been used to monitor factors during alcoholic fermentation. A selection of molecular monitoring protocols are described in Cocolin and Ercolini, (Eds.) *Molecular Techniques in the Microbial Ecology of Fermented Foods* (2008) Springer, Mills et al., *"Wine Fermentation"*, Chapter 6, pages 162-192, for example.

Perhaps the easiest, simplest, and most inexpensive way to monitor microbes is by using basic sensory cues. For example, if odors of ethyl acetate (nail polish remover), amyl acetate (banana skin) and other off odors are noticed, mold or other fungi are usually present.

As further shown in FIG. 18, if undesirable matter is found to be present during monitoring, multi-celled fungi 94 can be specifically identified by various quantitative tests and procedures known to those of skill in the art including chemical tests and microscopic examination. Polymerase Chain Reaction-Denaturing Gradient Gel Electrophoresis (PCR-DGGE) monitors fungi potentially involved in wine defects, for example. Alternatively, simple qualitative tests, including visual confirmation of oily or gelatinous substances on the cap and/or juice surface can be used successfully to monitor multicellular fungi.

If reduced sulfur compounds are present 92, an oxidative metal plate 98 can be used (or added if a plurality of blades and plates are chosen to be employed) If any one or a combination of the following are present: harmful bacteria 93; multi-celled fungi 94; and/or biogenic amines 95, then a noble metal plate 99 can be used (or added if a plurality of blades and plates are chosen to be used). If reduced sulfur compounds and biogenic amines are present at the same time in the same ferment, a combination of oxidative metal (preferably copper) and noble metal (preferably silver) plates can be used simultaneously to mitigate the undesirable matter and regulate the parameters during the fermentation of the beverage thereby optimizing the attributes, for example.

As per certain embodiments of the invention, the predetermined schedule 85 can be modified 101 in the event undesirable matter becomes present or changes form during fermentation (i.e. before fermentation is completed). The modified schedule 101 then overrides the predetermined schedule 85 and the modified schedule 101 is implemented. A feedback loop ensures continual monitoring of the fermentation for undesirable matter and the mitigation or elimination of the same.

The previously described embodiments of the subject invention have many advantages, including managing cap material and selectively mitigating undesirable matter during fermentation. Such embodiments provide new, useful and non-obvious methods and apparatus for cap management that regulate fermentation parameters and optimize organoleptic attributes while selectively mitigating (or eliminating) undesirable matter including reduced sulfur compounds, harmful bacteria, multicellular fungi and/or biogenic amines.

Although embodiments of the invention have been described in considerable detail with reference to certain preferred versions thereof, other embodiments are possible. Therefore, the spirit and scope of the appended claims should not be limited to the descriptions of the embodiments above.

What is claimed is:

1. A method of regulating parameters in a cap material and a juice during a primary fermentation of an alcoholic beverage to optimize attributes and mitigate undesirable matter, the method comprising the steps of:

provide a mixing apparatus for use during the fermentation, the apparatus comprising:
a) a rigid shaft having a first end and a second end;
b) an agitation blade affixed to the shaft at a location between the first end and the second end, the agitation blade disposed at an oblique angle relative to the shaft; and
c) a plate releasably attached to the blade; wherein the plate has an optimized surface area that includes a metal;

positioning the shaft of the apparatus in an substantially vertical orientation above a vessel, the vessel containing the cap material and the juice;

extending the apparatus downward to a predetermined depth in the vessel;

wherein the blade and plate contact the cap material for a predetermined duration of time to at least partially submerge and horizontally relocate a portion of the cap material under the juice;

retracting the apparatus upward so as to cause the blade to rise at least partially above the cap material;

repeating a number of the extending and retracting steps, whereby the apparatus produces a reciprocal motion to repeatedly mix the cap material with the juice;

repositioning the shaft of the apparatus to another location over the vessel; and repeating the positioning, extending, retracting and repositioning steps according to a predetermined schedule to regulate predetermined parameters during the primary fermentation of the beverage and thereby optimize the attributes and mitigate the undesirable matter.

2. The method of claim 1, wherein the apparatus comprises a plurality of blades; the shape of each blade being the same shape or a different shape from another blade; the oblique angle of each blade being individually adjustable relative to the shaft; and the location of each blade being individually adjustable along the shaft between the first end and the second end of the shaft.

3. The method of claim 1, wherein the attributes include organoleptic characteristics selected from the group consisting of aroma, mouthfeel and taste.

4. The method of claim 1, wherein the schedule includes at least one variable selected from the group consisting of: a) the horizontal location of the shaft of the apparatus above the vessel relative to the cap; b) the vertical height of the plate above the cap; c) the depth the apparatus is extended downward into the vessel; d) the duration of time the blade and plate contact the cap material; e) the number the extending and retracting steps are repeated; and f) the horizontal location the shaft of the apparatus is repositioned over the vessel after step e) is conducted.

5. The method of claim 1, further comprising:
monitoring the primary fermentation to determine the presence of undesirable matter; and
modifying the predetermined schedule based on the presence of undesirable matter.

6. The method of claim 5, further comprising:
selecting a copper plate when the monitoring step confirms the presence of a reduced sulfur compound; and
testing the level of copper in the juice during the fermentation and after the fermentation.

7. A method of regulating parameters in a cap material and a juice during a primary fermentation of an alcoholic beverage to optimize attributes and mitigate undesirable matter, the method comprising the steps of:
providing a mixing apparatus for use during the fermentation, the apparatus comprising:
a) a rigid shaft having a first end and a second end;
b) an agitation blade affixed to the shaft at a location between the first end and the second end, the agitation blade disposed at an oblique angle relative to the shaft; and
c) a plate releasably attached to the blade; wherein the plate has an optimized surface area that includes a metal;
selecting one or more varietals;
identifying one or more vintages;
measuring one or more parameters;
choosing a desired wine style;
generating a predetermined schedule according to the selecting, identifying, measuring, and choosing steps;
implementing the schedule near a beginning of the fermentation by using the mixing apparatus according to the schedule;
monitoring the fermentation to determine the presence of undesirable matter; and
modifying the schedule if the presence of undesirable matter is detected during the monitoring step to regulate the parameters during the fermentation of the beverage and thereby optimize the attributes and mitigate the undesirable matter.

8. A method of managing a primary fermentation to create a wine while mitigating the deleterious effects of undesirable matter, the fermentation including a cap material floating above a juice, the method comprising the steps of:
providing a mixing apparatus for use during the fermentation, the apparatus comprising:
a) a rigid shaft having a first end and a second end, an attachment mechanism attached at the first end;
b) a blade adjustably affixed to the rigid shaft at a location between the first end and the second end, the blade adjustably disposed at an angle of between about 25 and 85 degrees relative to the shaft; wherein the shape of the blade is a regular polygon; and
c) a plate releasably attached to the blade; wherein the plate has an optimized surface area that includes an oxidative metal, a noble metal or a combination thereof, the plate first contacting the cap material in use;
positioning the shaft of the apparatus in an substantially vertical orientation above an open-top fermentation vessel, the vessel containing the cap material and the juice;
extending the apparatus downward to a predetermined depth in the vessel;
wherein the blade and plate contact the cap material for a predetermined duration of time to at least partially submerge and horizontally relocate a portion of the cap material under the juice;
retracting the apparatus upward in a reciprocating motion so as to cause the blade to rise at least partially above the cap material;
repeating a number of the extending and retracting steps, whereby the apparatus repeatedly submerges and horizontally relocates portions of the cap material under the juice;
repositioning the shaft of the apparatus to another location above the vessel;
repeating the positioning, extending, retracting and repositioning steps according to a predetermined schedule; wherein the predetermined schedule includes at least one variable selected from the group consisting of: a) the horizontal location of the shaft of the apparatus above the vessel relative to the cap; b) the vertical height of the plate above the cap; c) the depth the apparatus is extended downward into the vessel; d) the duration of time the blade and plate contact the cap material; e) the number the extending and retracting steps are repeated; and f) the horizontal location the shaft of the apparatus is repositioned over the vessel after step e) is conducted;
monitoring the primary fermentation for the presence of undesirable matter; and
modifying the predetermined schedule and using the apparatus accordingly in the event undesirable matter presents during the monitoring step so as to mitigate the deleterious effects of the undesirable matter during the wine creation.

* * * * *